US010623556B2

(12) United States Patent
Qiu et al.

(10) Patent No.: US 10,623,556 B2
(45) Date of Patent: *Apr. 14, 2020

(54) DISPLAYING CALL LOG INFORMATION ON A DISPLAY DEVICE

(71) Applicant: AT&T Intellectual Property I, L.P., Atlanta, GA (US)

(72) Inventors: Chaoxin Qiu, Austin, TX (US); Robert Stockwell, Danville, CA (US); Jeffrey Paul Johnson, Austin, TX (US); Les Bruce, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/644,664

(22) Filed: Mar. 11, 2015

(65) Prior Publication Data

US 2015/0189073 A1   Jul. 2, 2015

Related U.S. Application Data

(63) Continuation of application No. 11/287,147, filed on Nov. 25, 2005, now Pat. No. 9,008,293.

(51) Int. Cl.
*H04M 3/22* (2006.01)
*H04M 3/42* (2006.01)
(Continued)

(52) U.S. Cl.
CPC ...... *H04M 3/2218* (2013.01); *H04L 65/4076* (2013.01); *H04M 3/42042* (2013.01);
(Continued)

(58) Field of Classification Search
CPC ......... H04M 3/42042; H04M 3/42059; H04M 1/27455; H04M 1/57; H04M 1/575;
(Continued)

(56) References Cited

U.S. PATENT DOCUMENTS 6,778,544 B1   8/2004   Holiday
6,785,368 B1   8/2004   Eason et al.
(Continued)

FOREIGN PATENT DOCUMENTS

WO   2004075598 A1   9/2004

OTHER PUBLICATIONS

"Intec Launches Comprehensive IPTV Solution", Intec Press Release, Oct. 25, 2005, Intec, 1 page.
(Continued)

*Primary Examiner* — Antim G Shah
(74) *Attorney, Agent, or Firm* — Guntin & Gust, PLC; Robert Gingher

(57) ABSTRACT

A method includes receiving a request from a television network server via a message mediation server for call log entries associated with multiple calls delivered to a telephony device. The method includes sending call log information to the television network server to enable display of the call log entries at a display device. The method includes receiving user input to delete a call log entry of the call log entries from a second media device via the message mediation server. The method includes deleting the call log entry from the call log information to generate revised call log information. The method includes receiving a second request from the television network server for the call log entries. The method includes sending the revised call log information to the television network server via the message mediation server to enable display of the call log entries at a second display device.

20 Claims, 12 Drawing Sheets

(51) Int. Cl.
  *H04M 7/00* (2006.01)
  *H04N 21/4788* (2011.01)
  *H04N 21/61* (2011.01)
  *H04L 29/06* (2006.01)
  *H04N 7/173* (2011.01)
(52) U.S. Cl.
  CPC ............ *H04M 7/006* (2013.01); *H04N 7/173* (2013.01); *H04N 21/4788* (2013.01); *H04N 21/6125* (2013.01)
(58) Field of Classification Search
  CPC .... H04M 1/576; H04M 15/56; H04M 11/085; H04N 7/025; H04N 7/0255; H04N 7/0882; H04N 7/0884; H04N 5/44513; H04N 2005/4403; H04N 2005/4412; H04N 2005/4456; H04N 2005/44513
  USPC .............. 379/93.23, 142.01, 142.04, 142.07, 379/142.16, 142.17, 183, 207.15; 370/351, 352; 348/461; 725/100, 106, 725/131, 139
  See application file for complete search history.

(56) References Cited

U.S. PATENT DOCUMENTS

| | | | |
|---|---|---|---|
| 6,798,767 B1 * | 9/2004 | Alexander | H04L 12/66 370/352 |
| 6,882,709 B1 * | 4/2005 | Sherlock et al. | 379/90.01 |
| 6,917,610 B1 | 7/2005 | Kung et al. | |
| 7,088,805 B1 * | 8/2006 | Moore | H04M 15/00 379/121.05 |
| 7,136,651 B2 | 11/2006 | Kalavade | |
| 7,290,076 B2 | 10/2007 | Valenci | |
| 7,385,992 B1 | 6/2008 | Koch et al. | |
| 8,160,222 B2 * | 4/2012 | White et al. | 379/142.17 |
| 9,008,293 B2 * | 4/2015 | Qiu et al. | 379/142.16 |
| 9,083,564 B2 * | 7/2015 | McCarthy | H04L 12/66 |
| 2003/0064711 A1 | 4/2003 | Gilbert et al. | |
| 2003/0086432 A1 | 5/2003 | Bartfeld et al. | |
| 2003/0231647 A1 | 12/2003 | Petrovykh | |
| 2004/0031058 A1 | 2/2004 | Reisman | |
| 2004/0083493 A1 | 4/2004 | Swisher et al. | |
| 2004/0105433 A1 | 6/2004 | Seo | |
| 2004/0131357 A1 | 7/2004 | Farmer et al. | |
| 2004/0151292 A1 | 8/2004 | Larsen | |
| 2004/0248560 A1 | 12/2004 | Bedingfield et al. | |
| 2004/0261115 A1 * | 12/2004 | Bartfeld | H04L 29/06027 725/106 |
| 2005/0073999 A1 | 4/2005 | Koch | |
| 2005/0174987 A1 | 8/2005 | Raghav et al. | |
| 2005/0251822 A1 | 11/2005 | Knowles et al. | |
| 2006/0031897 A1 | 2/2006 | Pulitzer | |
| 2006/0041916 A1 | 2/2006 | McQuaide, Jr. | |
| 2006/0041923 A1 | 2/2006 | McQuaide, Jr. | |
| 2006/0062369 A1 | 3/2006 | Kent, Jr. et al. | |
| 2006/0072726 A1 | 4/2006 | Klein et al. | |
| 2006/0085832 A1 * | 4/2006 | Groff et al. | 725/106 |
| 2006/0115062 A1 * | 6/2006 | Gonder et al. | 379/142.01 |
| 2006/0256734 A1 * | 11/2006 | Erhart et al. | 370/254 |
| 2006/0262913 A1 * | 11/2006 | Cook | H04M 1/57 379/88.19 |
| 2007/0049255 A1 | 3/2007 | Bhakta et al. | |
| 2007/0101351 A1 | 5/2007 | Bagsby et al. | |
| 2007/0107019 A1 | 5/2007 | Romano et al. | |
| 2007/0115389 A1 | 5/2007 | McCarthy et al. | |
| 2007/0121584 A1 | 5/2007 | Qiu et al. | |
| 2007/0121599 A1 * | 5/2007 | Soo | H04M 1/57 370/356 |
| 2007/0140150 A1 | 6/2007 | Beck et al. | |
| 2007/0140299 A1 | 6/2007 | Hofmann et al. | |
| 2007/0209065 A1 | 9/2007 | Branam et al. | |
| 2007/0263808 A1 | 11/2007 | Van Wyk et al. | |
| 2008/0109839 A1 | 5/2008 | Bruce et al. | |
| 2008/0125098 A1 | 5/2008 | Bruce et al. | |
| 2008/0152110 A1 | 6/2008 | Underwood et al. | |

OTHER PUBLICATIONS

Beck, A., et al., "Blending Telephony and IPTV: Building the TV-Link Service Package Using the Alcatel-Lucent Service Broker™", Bell Labs Technical Journal 12(1), 23-39 (2007). Wiley Periodicals, Inc., 18 pages.

El-Sayed, M., et al., "Comparison of Transport Network Technologies for IPTV Distribution", Bell Labs Technical Journal 11(2), 215-240 (2006) Wiley Periodicals, Inc., 27 pages.

Grech, M.L.F., et al., Using Open Service Access to Enable Mobile Internet Applications in UMTS Networks, Lucent Technologies, 3G Mobile Communication Technologies, Mar. 26-28, 2001, Conference Publication No. 477 0IEE 2001, 5 pages.

International Search Report and Written Opinion for International Application No. PCT/US06/42576 dated Nov. 1, 2007, 9 pages.

International Search Report and Written Opinion of the International Searching Authority for International Application No. PCT/US07/07825, dated Jun. 18, 2008, 9 pages.

Pollett, et al., "Telecom Services Delivery in a SOA", Proceedings of the 20th International Conference on Advanced Information Networking and Applications (AINA'06), IEEE 2006, 5 pages.

Rajagopulan, Ravi, "The Impact of Open Service Access on Network Services", Lucent Technologies-Bell Labs Innovations, Nov. 15, 2002, 7 pages.

Varney, D., "Parlay's Role in SOA", The Parlay Group, Oct. 11, 2005, 29 pages.

* cited by examiner

```
Call server: 172.16.132.162
Called party user agent: 172.16.1.57
MMS user agent: 172.16.10.100

172.16.10.100(MMS)  172.16.132.162:506   172.16.132.162:507   172.16.1.57:5060
|                    |                    |                    |
|         602        |                    |                    |
|<-------------------(sdp) INVITE F1<|                         |
|                    |                    |         604        |
|                    |>F2 INVITE (sdp)---------------------->|
|                    |                    |                    |
|                    |<------------------- Trying 100 F3<|
|                    |                    |         606        |
|>F4 486 Busy Here ------------------>|                        |
|         608        |                    |                    |
|                    |<------------------- Ringing 180 F5<|
|                    |                    |         610        |
|<-------------------------- OK 200 F9<|                       |
|                    |         612        |                    |
|                    |<-------------------(sdp) OK 200 F7<|
|                    |                    |         614        |
|                    |                    |>F8 ACK --------->|
|                    |                    |         616        |
|                    |                    |>F10 INVITE (sdp)>|
|                    |                    |         618        |
|                    |                    |<(sdp) OK 200 F14<|
|                    |                    |         620        |
|                    |                    |>F15 ACK -------->|
|                    |                    |   622              |
|                    |                    |<-------- BYE F16<|
|                    |                    |                    |
|                    |                    |>F17 200 OK ----->|
|                    |                    |626
```

Figure 6

DISPLAYING CALL LOG INFORMATION ON A DISPLAY DEVICE

CROSS-REFERENCE TO RELATED APPLICATIONS

This application claims priority from, and is a continuation of, U.S. patent application Ser. No. 11/287,147, filed Nov. 25, 2005, the content of which is incorporated herein by reference in its entirety.

FIELD OF THE DISCLOSURE

The present disclosure relates to communications, and in particular to systems, methods and machine-readable media to display call log information on a display device.

BACKGROUND

Internet Protocol (IP) Television (IPTV) refers to a system where a digital television service is delivered to subscribers using an Internet Protocol over a broadband connection. The service typically may be supplied by a broadband operator and may also include Video on Demand (VOD) and Internet services such as Web access and Voice over Internet Protocol (VoIP) telephony using the same infrastructure.

An IPTV system uses two-way communication and therefore may typically use broadband technology such as xDSL over the Local loop. Television programming content may be acquired and stored for delivery to subscribers using, for example, a Digital Subscriber Line Access Multiplexer (DSLAM). Network architecture for IPTV differs, therefore, from conventional cable television system architecture.

Advantages of IPTV include two-way capability unavailable with traditional TV distribution technologies, as well as point-to-point distribution which allows each subscriber or user to view selected content at their convenience. IP distribution enables stream control such as pause, fast forward, rewind functions and so forth. Another advantage is the individualized selection of programming content such as one might find on the World Wide Web.

Traditional television distribution technologies such as terrestrial, satellite and cable Television do not use real packet switching transport on an access network. VOD in the United States may typically be delivered over cable TV using the Digital Video Broadcasting (DVB) protocol on selected frequency bands and is not deemed an IPTV service.

Typically, analog signal based caller ID devices are attached to phone jacks using RJ-11 cables. While a cable set-top box (STB) may enable caller ID notification to a television display, the STB may require running an RJ-11 cable from a phone jack to the STB, which may be both technically difficult and operationally undesirable.

Legacy telephony networks currently may offer a caller ID service to customers. IP-based voice services also may have the capability to deliver caller ID and other call management information or identifying indicia via call signaling to a called party.

The present disclosure describes network-based methods and systems for transferring caller ID information from a telephony network to an IPTV network, along with describing other features and advantages of the disclosure. Network-based systems of the present disclosure may provide advantages over approaches that, for example, may call for obtaining caller ID information from within the customer's local IP-based home network.

BRIEF DESCRIPTION OF THE DRAWINGS

The present disclosure as set forth in the detailed description that follows, by way of non-limiting examples, makes reference to the noted drawings, in which reference numerals represent the same parts throughout the several views of the drawings, and in which:

FIG. 6 is a process flow diagram illustrating an exemplary embodiment of a call forking process of the present disclosure.

DETAILED DESCRIPTION

In view of the foregoing, the present disclosure, through one or more various aspects, embodiments and/or specific features or sub-components, is thus intended to bring out one or more of the advantages that will be evident from the description. The present disclosure makes frequent reference to one or more specific embodiments. Such specific embodiments are merely illustrative rather than limiting. The terminology, examples, drawings and embodiments, therefore, are not intended to limit the scope of the disclosure.

The present disclosure describes embodiments for the integration of service provisioning, subscriber account and policy information between telephony services and IP-based television services. For example, specific embodiments intercept voice call signaling to retrieve caller ID, caller name information, and other call management information, at the call server in the network to deliver an appropriate notification message to the IP-based TV network at a notification server, which in turn sends a message notification to the called party's TV screen.

Accordingly, the present disclosure describes a network-based system for caller ID notification delivery to TV screens. The system simplifies the wiring of equipment and addresses security risks while providing more features by delivering telephony services, such as cellular call notifications, voice and email message previewing and waiting, instant messaging, and so forth, to IP-based TV users.

Figure 1:
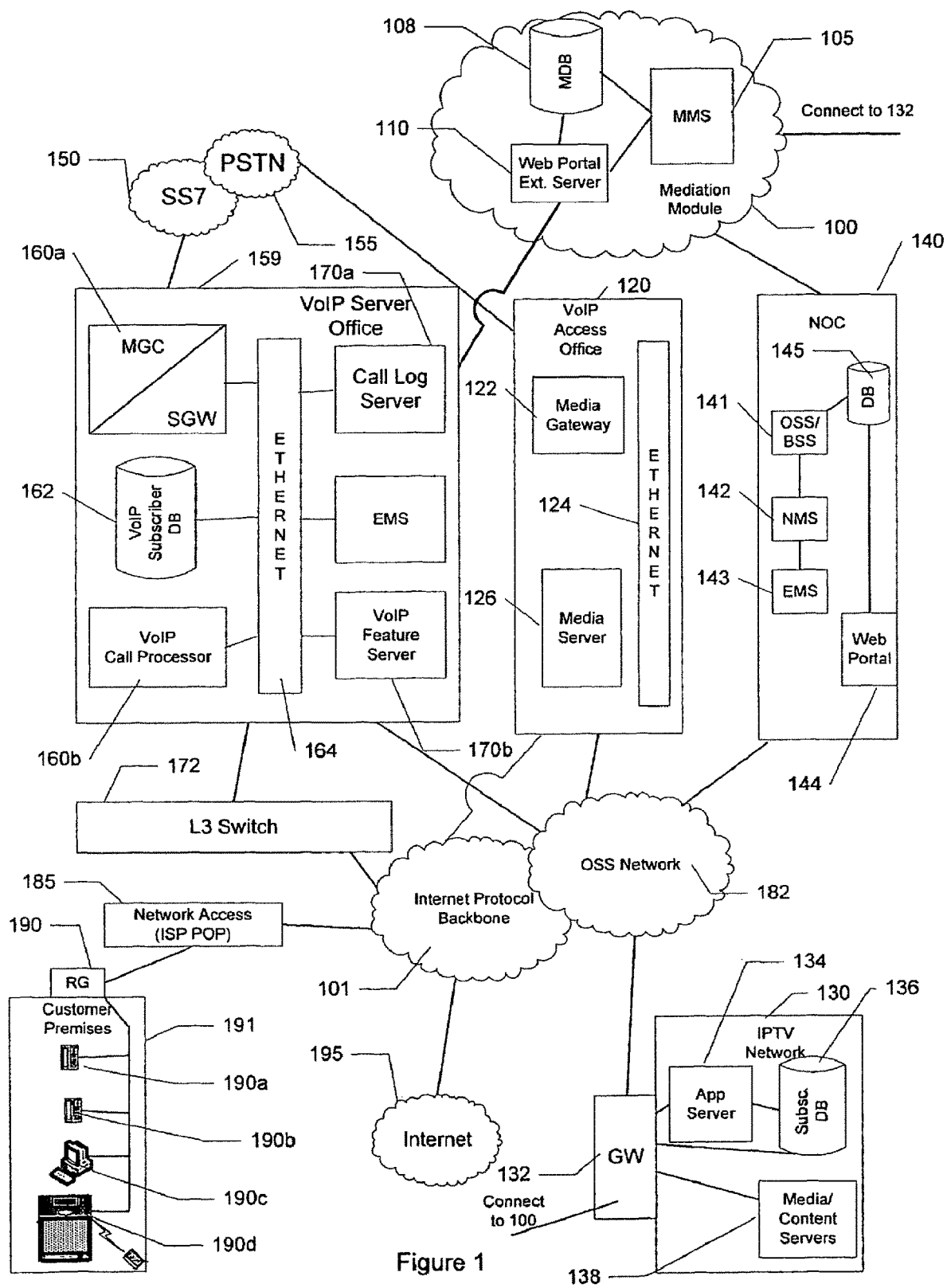
FIG. 1 is a diagrammatic illustration of a specific exemplary embodiment of a caller ID notification system of the present disclosure.

FIG. 1 is a diagrammatic illustration of a network overview for a specific exemplary embodiment of a system of the present disclosure. Components of the system include, but are not necessarily limited to, a mediation module 100 having a MDB 108, Mediation Message Server 105 and web portal extension server 110. Network Operations Center (NOC) 140 may include OSS/BSS component 141; Network Management System (NMS) 142; Element Management systems (EMS) 143; web portal 144 and Subscriber Management System (SMS) database 145. SS7 network 150 may be the signaling infrastructure for Public switched PSTN network 155. Voice/Voice over Internet Protocol (VoIP) Access Office 120 may include VoIP media gateway 122, media server 126 and Ethernet linkage 124.

VoIP Server Office 159 may include Media Gateway Controller (MGC)/Signaling Gateway (SGW) MGC/SGW 160a; VoIP call processor 160b; call log server 170a; VoIP Feature Server (FS) 170b; and subscriber database 162. Ethernet 164 facilitates interaction among the components of VoIP server Office 159. Switch or IP router 172 links VoIP Server Office 159 and Internet Protocol (IP) backbone 101, which may be networked to OSS (Operational Support System) network 182 and to Internet 195. Network Access 185 feeds communication lines to the customer premises having a residential gateway (RG) 190. Residence 191 may include phone terminals 190a and 190b, personal computer 190c and IPTV/STB 190d. Additionally, network 182 may connect via gateway 132 to IPTV network 130 which may include application server 134 Subscriber database 136 and media/content servers 138. Gateway 132 links IPTV network 130 to Mediation Module 100 via the OSS network 182. For embodiments in which IPTV network 130 may have a plurality of application servers 134, at least one application server 134 may be dedicated as a notification server to IPTV subscribers while another application server 134 may be dedicated as a remote terminal server for one or more IPTV set-top boxes.

Continuing with FIG. 1, a system of the present disclosure for caller ID notification to IP televisions provides a Mediation Module 100 to bridge information flow between a Voice over Internet Protocol (VoIP) platform and an IPTV platform. The mediation module consists of three functional components:

1) A Mediation Database (MDB) 108 to facilitate an integrated view of customer information, service provisioning, system configuration, and policies that govern the information access and flow;

2) A Mediation Message Server (MMS) 105 to receive notification from a VoIP platform, for example, of an incoming call (with the caller ID information), convert the message to a notification in, for example, HTTP/XML format, and send the converted message to a gateway server in a VoIP Server Office 159 serving the customer who is going to receive the incoming call; and 3) An extension of Web Portal 110 to retrieve call log information from the IPTV platform—including caller ID information about the call, re-format the caller ID information entries if necessary, and send the call log entries to a terminal server in a VHO serving the requesting customer. Web Portal 110, together with Mediation Module 100, provides access to selected or pre-selected information such as customer information, service provisioning, system configuration, policies and call log information.

FIG. 1 further illustrates two paths of information flow:

1) For Caller ID Notification:

a. Session Initiation Protocol (SIP) Interface between VoIP call processor 160b and MMS 105;

b. An API (based on HTTP/XML or SOAP) between MMS 105 and an application server 134 within an IPTV network 130; and c. An API between the application server 134 within IPTV network 130 and IPTV set-top box (STB) 190d.

2) For Call Log Browsing:

a. A call record interface between VoIP call processor 160b and call log server 170a;

b. An interface (such as a standard HTTP interface) between call log server 170a and web portal extension server 110;

c. An interface (such as a standard HTTP interface) between Web Portal 110 and IPTV network 130, combined with, preferably, an application server 134 to serve as a remote terminal server to one or more IPTV set-top boxes; and d. A Remote Desktop Protocol (RDP) between an application Server 134 and an IPTV STB 190d.

The required customer data and network provisioning data exist under the general framework of OSS/BSS, SDP and IPTV. The Mediation Database (MDB) maps the VoIP account information (mainly the phone number) to a corresponding user account ID for his/her IPTV service. A local presence of such a database may be desirable to allow real-time look up for notification and to avoid delays due to database queries into multiple database tables. A VoIP Web Portal 110 for both business VoIP (HIPCS) and the VoIP customers may incorporate more telephony features than just call log viewings and may be leveraged to support similar call log functions on IPTV. The Mediation Message Server (MMS) 105 may accept the SIP message and convert the SIP message into a notification message. MMS 105 may facilitate real-time performance as part of the call signaling process, even though the MMS 105 does not stand in the path of VoIP call set-up.

Figure 2:
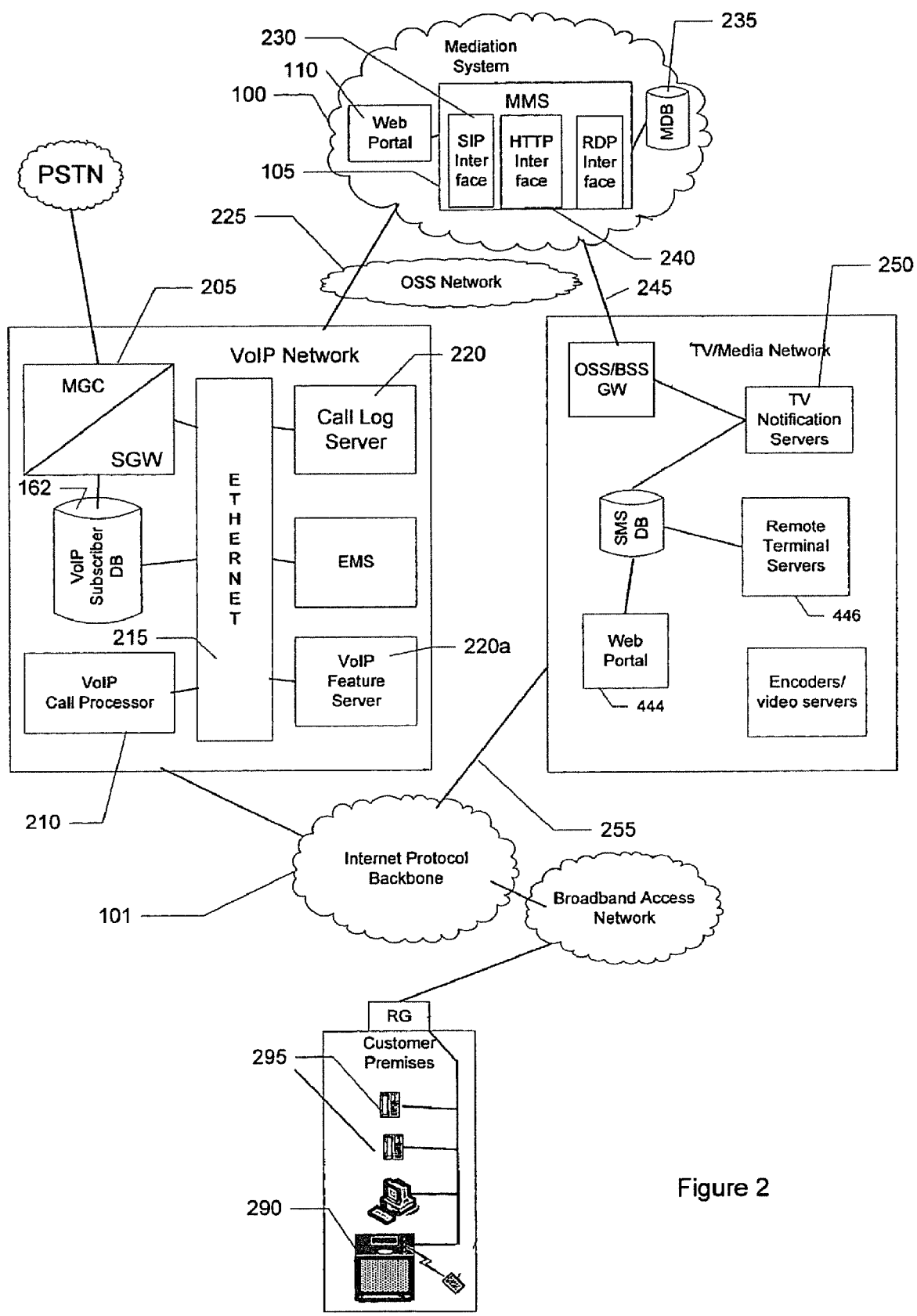
FIG. 2 is a diagrammatic illustration of a specific exemplary embodiment of a caller ID notification system of the present disclosure.
Figure 3:
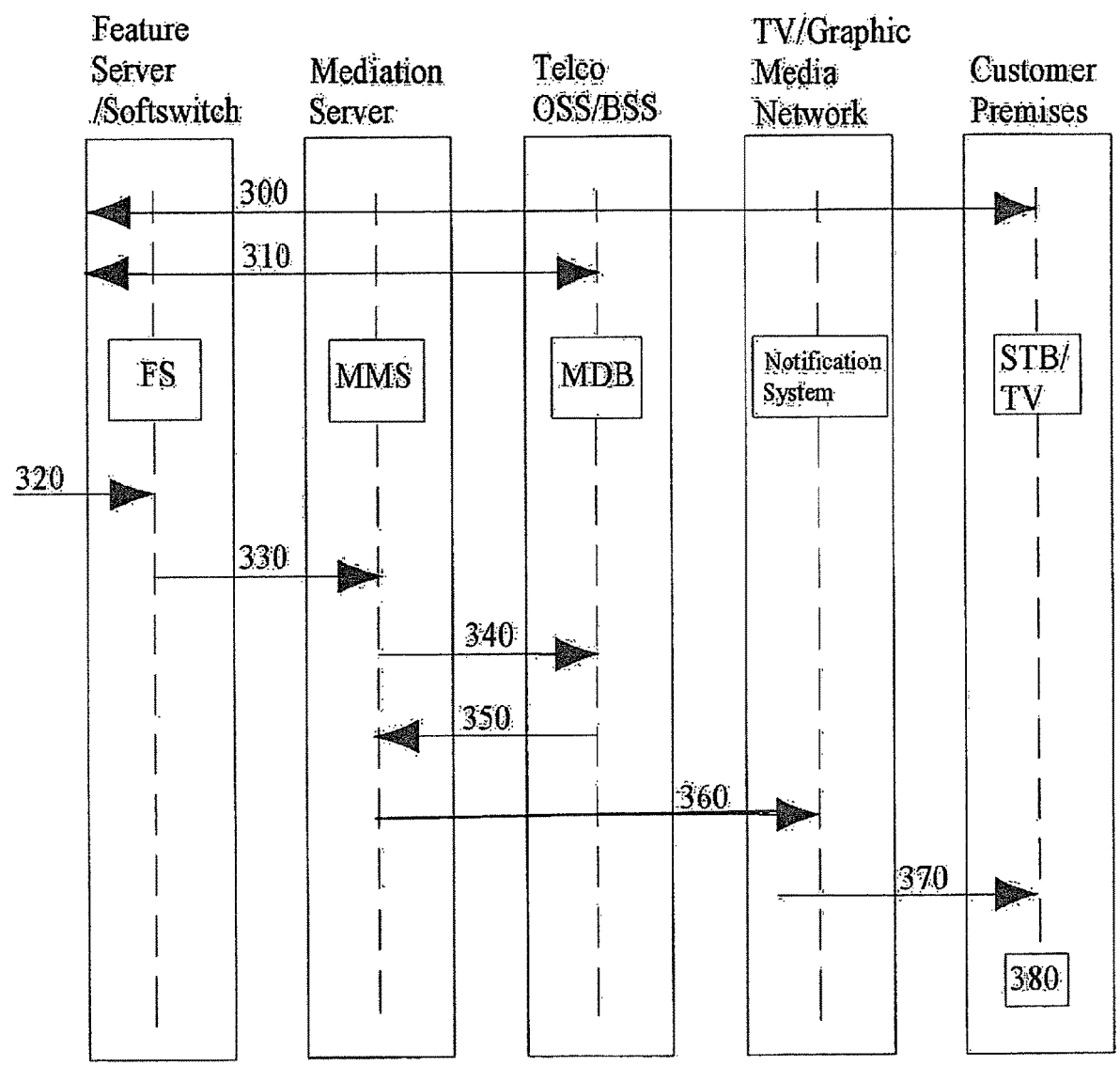
FIG. 3 is a diagrammatic illustration of a specific exemplary embodiment of a call flow process of the present disclosure.

FIG. 2 is a diagrammatic illustration of a specific exemplary embodiment of a caller ID notification system of the present disclosure. FIG. 3 is a diagrammatic illustration of a specific exemplary embodiment of a call flow process of the present disclosure. FIGS. 2 and 3 illustrate an example of the overall design of a caller ID delivery approach of the present disclosure from the VoIP platform to the IPTV platform. FIG. 2 presents a network based view and FIG. 3 presents an event flow, so both Figures are described below with reference to each other.

Caller ID Notification flow

1. An incoming call hits VoIP call processor 210 at 230, asking for connection to a "destination" telephone number in an exchange. VoIP call processor 210 forwards the call to VoIP Feature server 220a using, for example, SIP protocol on Ethernet link 215.

2. Feature Server (FS) 220a checks subscriber database 162 to determine if a called destination number corresponds to a VoIP or IPTV customer number.

3. If number check fails, FS 220a drops the call by doing nothing (may forward normal "disconnected/no longer in Service" audio) and terminates the call.

4. Else, number check passed, FS 220a checks whether customer has set "do not disturb."

5. If DoNotDisturb is set, FS 220a drops call, FS sends no IPTV notification.

6. If BlockCallerID is set, FS 220a may set a "privacy" flag and continue call processing.

7. If Call Forwarding is set, FS 220a may forward the call to the forwarded destination; call processing may continue based upon the configuration set by the forwarded party.

8. Else proceed with Notification. FS 220a may send a call forking invite to the destination number VoIP notification (e.g., SIP protocol INVITE) message 330 via link 225 to MMS 105. FS 220a may then send a SIP invite to the called party.

9. MMS 105 performs database lookup of destination number at 340. Lookup may be performed, for example, within either legacy OSS/BSS system gateway or dedicated local Mediation database (MDB) 235.

10. MDB Database 235 inquiry returns to MMS 105 data message 350 containing, for example:
   a. Valid customer yes/no.
   b. All telephone numbers for that customer.
   c. IPTV customer yes/no; if yes, IPTV customer external ID.
   d. IPTV Set-top receiver (STB) enabled yes/no, for each set-top box 290; if yes, device ID for each STB.
   e. Fully qualified domain name, IP address, ID #, service level, and so forth, for the IPTV Hub Office that serves the called party. Note that this information may be previously recorded at the STB provisioning time, or via the SMS Gateway at runtime.

11. If the destination number is not an IPTV customer, MMS 105 drops IPTV call notification by doing nothing. Note that the VoIP system may still notify via SIP to phones, provided that such notification is supported by the VoIP gateway 205.

12. Else the called party is IPTV customer.

13. Because the destination number is an IPTV customer, MMS 105 may send a Caller ID Notification message 360 via link 245 to IPTV Notification system 250, once per STB 290. The message may be formatted using a Web Service API, such as SOAP, or MS RDP protocol. The message may contain the IPTV customer's external ID and the device ID for the target IPTV STB. The message may contain other information, such as the serving IPTV hub office ID (for example, a fully qualified domain name) and message to-live parameter.

14. At approximately the same time, MMS SIP interface 230 logs a "call" transaction of the call to MDB database 235, suitable for later Call Log retrieval. Transaction contains Caller ID, time, and so forth.

15. IPTV Notification system 250 (e.g., subsystem "Service Information System" (SIS)) receives an API-format Notification message sent by MMS Web Portal 240/110. Notification system 250 may accept Notification message in HTTP protocol, or RDP protocol. The message causes IPTV Notification server 250 to create Client Notification message 370 suitable for STB 290 (e.g., HTTP), and Notification server 250 sends message 370 directly to STB 290 via link 255 at a unique STB address.

16. STB 290 renders Caller ID pop-up 380 on customer TV display.

17. If customer turns off/acknowledges pop-up 380, STB 290 closes the pop-up.

18. Customer answers VoIP call on telephone 295. Normal VoIP call sequence proceeds until circuit teardown.

The above description of the network view assumes that provisioning procedure 300 of customer ID codes, Feature server database, Mediation server database, OSS database, SMS database, and Customer premises equipment has been completed for the customer's set-top box when customer's services are provisioned for service activation.

The description further assumes that provisioning procedure 310 of customer ID codes, Feature server database, Mediation server database, OSS database has been completed for customer's VoIP telephone number or services mapping to the customer's IPTV services set-ups.

Figure 4:
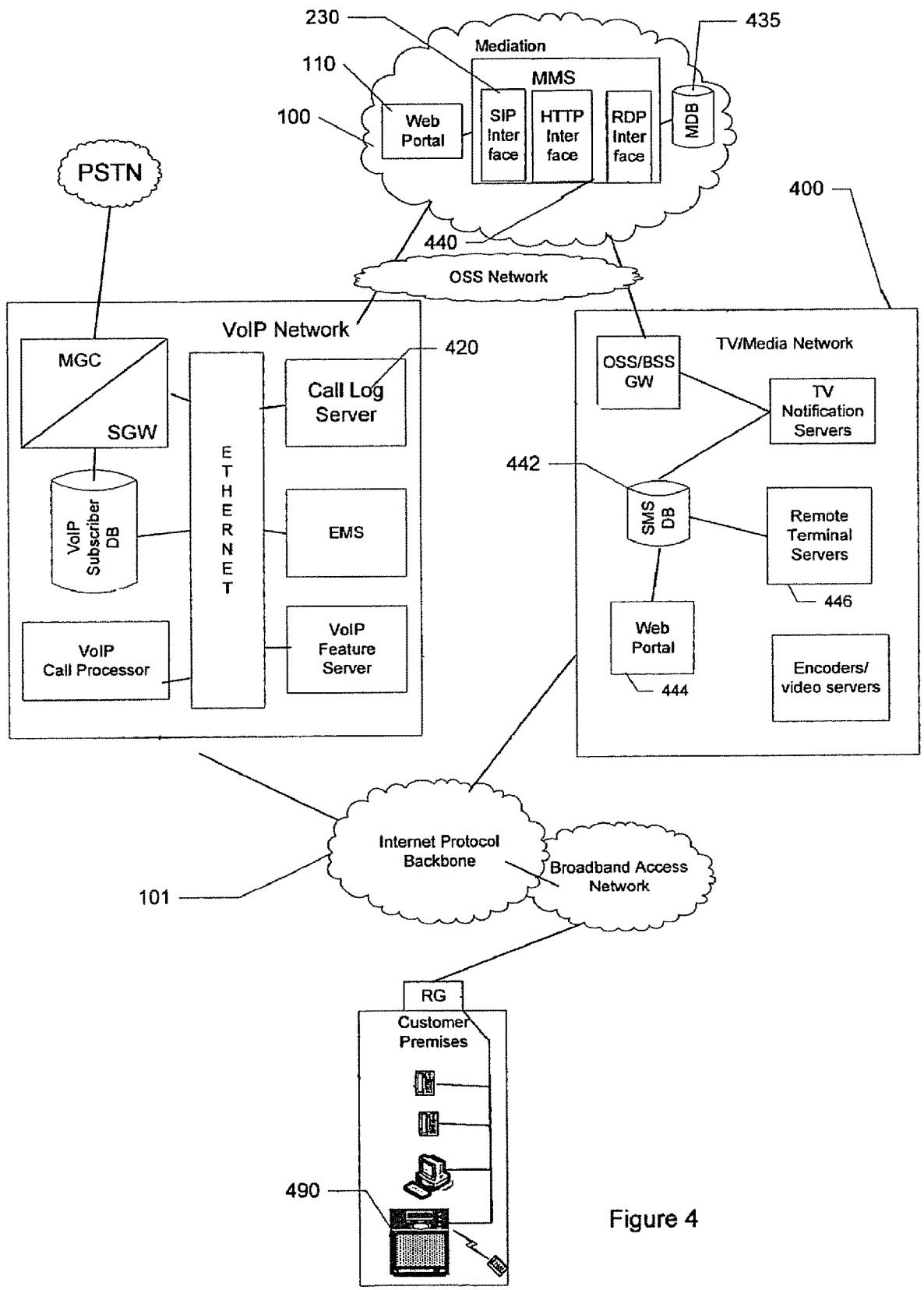
FIG. 4 is a network view diagrammatic illustration of a specific exemplary embodiment of a call log system of the present disclosure.
Figure 5:
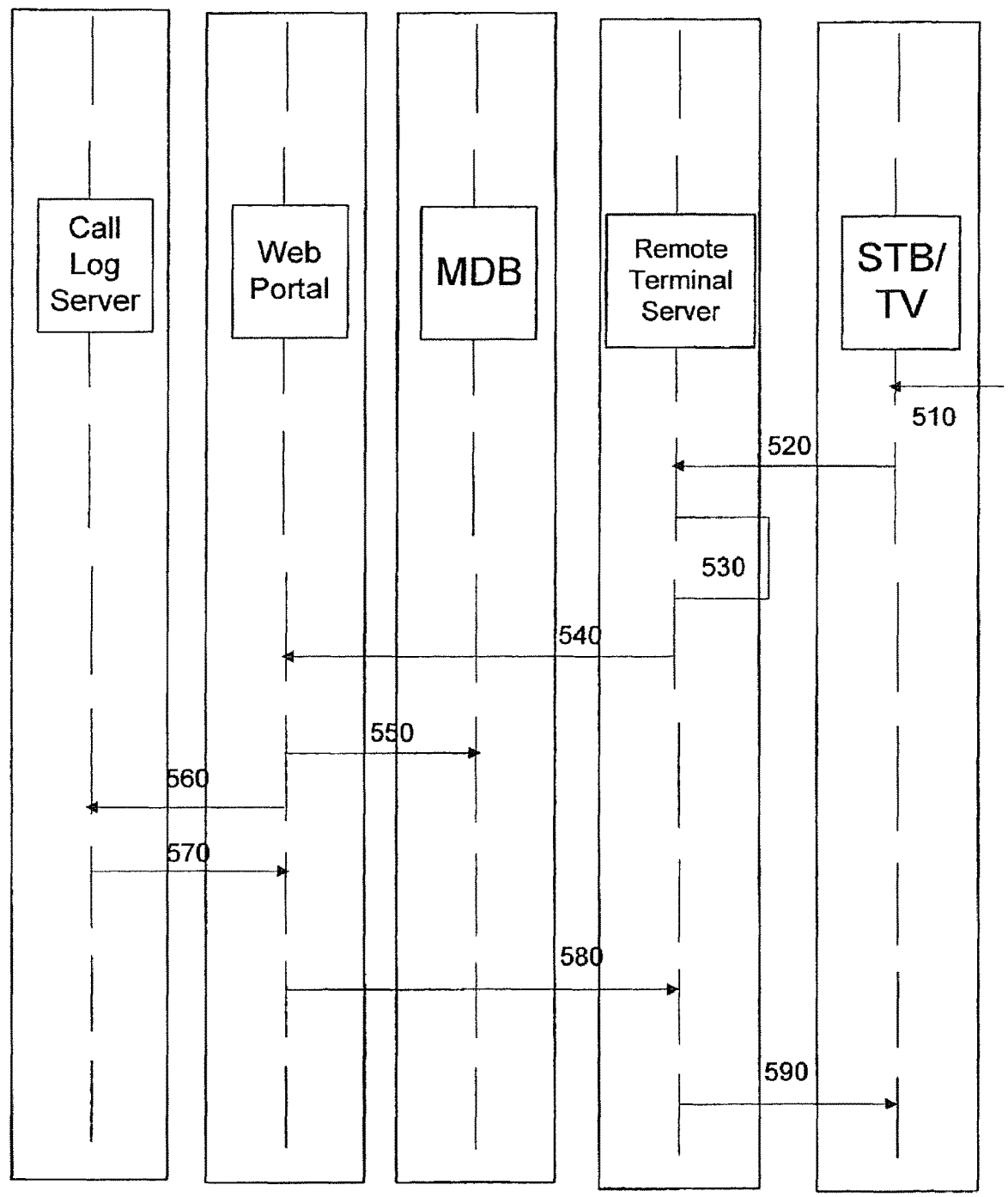
FIG. 5 is a process flow diagrammatic illustration of a specific exemplary embodiment of a call log process of the present disclosure.

FIG. 4 is a network view diagrammatic illustration of a specific exemplary embodiment of a call log system of the present disclosure. FIG. 5 is a process flow diagrammatic illustration of a specific exemplary embodiment of a call log process of the present disclosure. FIG. 4 presents a network based view and FIG. 5 presents an event flow, so both Figures are described below with reference to each other.

Call Log flow

1. An IPTV customer initiates a call log browsing session on TV set-top box (STB) 490 at 510.

2. STB 490 sends appropriate API request (which may include a PIN number) to a local IPTV Window Terminal Server (WTS) 450 in a IPTV network branch office 400 at 520.

3. Remote Server 446 verifies whether the STB/customer has current service via lookup into SMS Database 442.

4. 530 If customer has current service, RT Server 446 accepts the request and attempts to verify PIN number inside request at 530. (Previous step may be incorporated into one IPTV-SMS query).

5. If customer has been disconnected, or PIN number does not match, RT Server 446 will terminate by doing nothing.

6. Else begin Call Log browsing session at 540: RT Server 446 or equivalent Web Service server sends browse (e.g., HTTP) request to MMS Web Portal server 110.

7. Web Portal server 110 sends a request to MDB 435, to resolve IPTV customer to VoIP telephone number mapping at 550. MDB 435 retrieves customer's phone number(s), URL, IP address, or other unique identifier. This may be done by sending a database request message to MDB 435 or to OSS Systems.

8. With the VoIP telephone number and other customer information, Web Portal server 110 retrieves stored (subset or all) Call Log entries, by customer, from Call log Server 420 call log database at 560. An inquiry may contain search filters such as single phone number incoming calls, missed calls, maximum number of lines to retrieve, and the like.

9. Call log server 420 returns requested call log data to Web portal 110, using, for example HTTP or HTTPS at 570.

10. Server 440 sends call log data to remote terminal server 446 at 580.

11. Remote terminal Server 446 formats data display suitable (e.g., HTTP) for STB 490 display then sends the formatted data display directly to the addressed STB 490 at 590.

12. STB 490 renders data onto TV screen, and then waits for user input.

13. Call Log inquiry process repeats (same PIN #) until all desired Call Log entries are displayed. Call Log deletion requests are handled in a similar fashion, but with MMS server 440 sending Delete requests instead of Query requests into Call Log Server 420 call log database. The interface between MMS 440 and the Call Log Server 420 may comply with SIP standard protocol (RFC 3261).

The MDB 435 may be an information repository which may include the following features:

1) The database contains customer identification information for those who subscribed to both VoIP and IPTV services. In particular,
 a. each IPTV customer has a globally unique external ID;
 b. VoIP customer ID;
 c. Phone numbers for primary line and other phone line numbers for each customer.

2) The MDB 435 contains the necessary identification and routing information for serving the Mediation Message Server and the IPTV Branch Office. In particular:
 a. an OSS/BSS gateway associated with the serving IPTV branch;
 b. a Serving Mediation Message Server (MSS).

3) The MDB 435 may be light weight and optimized for real-time look-up during the notification processes.

4) The MDB 435 may provide a local view of required information pieced together from multiple database sources. The present MDB implementation design avoids physically duplicating data fields that may reside in either of the VoIP and IPTV platform.

5) The MDB 435 contains one or more STB unique ID for each customer, which can be looked up based on customer's external account ID (that may be translated to a local internal ID).

6) An "On/Off" flag associated with each STB ID indicates whether or not the user has turned on/off the notification pop-up. The flag may be implemented locally within each STB. In that case, the notifications are sent to the STB, which decides whether or not to show the notification on the TV screen. If the flag function is not hosted within an IPTV branch office (the Subscriber Management System), then the flag function too may be included in MDB 435.

The notification mechanism recommended for Step 320 in FIG. 3 is the "call forking" feature. Call forking provides the following advantages:

1) Open standards: Call forking is a call processing feature provided by SIP to support PSTN offerings such as simultaneous ringing and so forth. In some embodiments the message server implements a simplified SIP engine to support the caller ID notification to provide a simple and open implementation that may not be dependent on a particular vendor.

2) Simplicity of call and notification processing: The message server may be capable of receiving a SIP INVITE message, but does not need to invoke further SIP interaction with the SIP INVITE sender (such as an FS in call set-up). Both the FS and the message server treat the SIP INVITE as a one-way notification to trigger a caller ID pop-up in the IPTV STB, with the complexity of a full SIP state engine for call set-up. The result may be a light-way approach that reduces the delay for the notification to reach the IPTV STB.

3) Simpler and accurate logic in triggering of the caller ID notification: A terminating device (e.g., a telephone) is rung only if the FS sends a SIP INVITE. Forking a simultaneous SIP INVITE to the message server ensures that the IPTV pop-up appears only if (at least one of the) terminating phones is supposed to ring. The caller ID notification semantic may be preserved with no extra cost in the call processing path. In contrast, other potential approaches lack of the above advantages. For example, other mechanisms require the MMS to process a huge amount of input data streams (CDV events) to get a rather small piece of caller ID information.

FIG. 6 illustrates the call forking from a VoIP call processor to a SIP user agent that represents a phone device and to MMS (for caller ID notification). In the FIG. 6, note that:
 Call server: 172.16.132.162
 Called party user agent: 172.16.1.57
 MMS user agent: 172.16.10.100

FIG. 6, discussed further below, illustrates the details of Step 5 of FIG. 2 and the same process steps shown in FIG. 5.

In reference to FIG. 2, Caller ID notification from VoIP to IPTV, one may note that there may be at least two different control mechanisms that enable a user to turn the notification on or off. One embodiment makes the notification an item in the main menu and the second embodiment enables a button in the pop-up screen to "disable" the notification. In either case, care should be taken so that the change is updated in the customer data DB (MDB 435).

An SMS database 442 may provide a symbolic name for IPTV/STBs and IPTV customers for a TV/media system of the present disclosure. The symbolic name may be translated into an external ID, such as a specific URL so that the IPTV customer may be identified easily in external systems.

An IPTV system or network, such as an IPTV network, may be architected based on the concept of a Web Service.

An MMS of the present disclosure may logically include, but not be limited to, the following machine-readable software components:

1) A SIP user agent that provides interface with a Feature Server, VoIP call processor, or Internet Protocol Multimedia subsystem (IMS) to receive and handle SIP INVITE messages according to SIP standard. One option may be to use call forking as described above. Alternative embodiments may employ an IP multimedia Subsystem Service Control Interface (ISC), which is discussed in more detail later in the present disclosure.

2) A client to the notification system in an IPTV system to implement an interface based, for example, on a Web Service API.

3) A message format translator to parse the information from a SIP INVITE and construct accordingly a message in compliance with the API.

4. A database interface to access the MDB or OSS database.

The following capabilities are recommended for the MMS:

1) Pre-configuration: When a new VoIP phone number is provisioned to a customer, an MDB data may be updated appropriately and an FS pre-configuration for the new phone number may be performed. The MMS endpoint may be pre-configured as a "Ring All" group member of the new phone number.

2) Provisioning and maintenance: Appropriate operational procedures maintain synchronization and accuracy of the information in the MDB and in the FS when a customer's phone service is changed.

3) Recommended requirements for a Call Processing Engine may include:
 3.1) support "call forking" feature.
 3.2) allow pre-configuration to statically register MMS as a "ring all" group member associated with a specified customer phone number.
 3.3) send simultaneous SIP INVITE to all endpoints belonging to the ring all group when a call is terminated to a customer's phone number that has a "ring all" group pre-configured.

4) Recommended requirements for the MMS:

4.1) parse all information such as calling number, caller ID, called number, and the like when the FS sends a SIP INVITE message, then construct a new caller ID notification message in a pre-specified format and send the new caller ID notification message to an appropriate gateway representing the serving IPTV branch for the called number.

4.2) respond to the SIP INVITE message sender (e.g., the FS) with a SIP 486 BUSY HERE message when the FS sends a SIP INVITE message. The FS responds with a SIP 200 OK.

The pre-configuration process is illustrated in FIG. 3 as Steps 300 and 310. The SIP INVITE "forked" by the FS is illustrated in FIG. 6. FIG. 6 is a process flow diagram illustrating an exemplary embodiment of a call forking process of the present disclosure. The process may include invite F1 at 602, invite F2 at 604, trying 100 F3 at 606, F4 486 Busy Here at 608, Ringing 180 F5 at 610, OK 200 F9 at 612, Ok 200 F7 at 614, F8 ACK at 616, F10 invite at 618, Oh 200 F14 at 620, F15 ACK at 622, and F17200 OK at 626.

The process flow to support the present caller ID notification is described generally as follows:

0) When a new customer is provisioned, the relevant information regarding his/her VoIP and IPTV services may be updated into MDB. MDB may be updated and kept in synch when a customer's provisioning and policy are modified. If STB caller ID "on/off" flag, together with STB ID, is included in MDB, then MDB may be updated every time a customer turns on or off the caller ID.

1) To add the MMS endpoint to the "Ring All" group of every new VoIP phone number a "sipuseragent creat" command is used. For example, for a certain Feature Server, the "sipuseragent creat" may be used. In contrast to SIP REGISTRATION method, endpoints added using the operational command is persistent. The FS, for example, uses this information to trigger a "forked" SIP INVITE message to MMS whenever the FS is sending a SIP INVITE to the terminating device possessing the phone number.

2) An incoming call (from a VoIP origination or a PSTN origination) is signaled to the FS. The FS performs the call set-up, triggers the CDR, and communicates with the SIP user agent resides in the called party's residential gateway (or an ATA device, or a SIP phone in his/her home network). If the call invokes some feature processing, such as find-me-follow-me (FMFM), call forward, conference call, and so forth, appropriate set-up procedures are performed.

3) The FS signals the called party to ring for the incoming call. Note that not every incoming call ends up ringing the called party at his/her residence. This may be due to the feature set-up, such as call forward, call block, and FMFM, which redirects the call to a third termination. Alternatively, this may be due to a network issue, such as bearer busy, termination busy, and so forth. Preferably, when the FS signals the called party to ring, the FS has conducted all necessary procedures in the call set-up process for the FS.

4) Simultaneously, the FS sends a SIP INVITE to MMS to notify for the incoming call and the called ID. A specific notification mechanism embodiment is discussed below.

5) MMS converts the FS notification to an HTTP/XML message in a format specified by the AppExtensibility Web Service API based on the information in the combined customer database. Additional details are discussed below.

6) MMS sends the converted notification message to an IPTV notification server via an associated gateway.

7) The IPTV notification server sends a notification to a specified STB residing in the called party's home.

8) The STB presents the notification message as a pop-up screen on the TV in a predefined layout format (if the pop-up has not been turned off). The STB logs the incoming notification.

IPTV branch office software components are known to those of skill in the art. Nonetheless, points of interests with respect to the present disclosure include:

1) Notification Systems: allow external clients (e.g., the notification message server described above) to send messages to the TV clients via an STB. A notification system may offer a Web Service based API, which may be a different mechanism than the Remote Terminal Server that communicates with the TV client via STB using a Remote Desktop Protocol. The latter may be for feature rich applications such as call logs.

2) OSS/BSS Gateway: provides communication services with external clients within OSS/BSS network. External notifications may be routed through this gateway to reach an appropriate Notification Server within the IPTV branch office. When an incoming call is processed by the feature server and results in a SIP INVITE to MMS, MMS sends the Web Service message to the OSS/BSS Gateway. The gateway in turn sends the message to the notification system.

3) Subscriber Management System (SMS): provides a front-end internal to other applications within the IPTV Branch Office for access to configuration information customer accounts, service and network provisioning. SMS may also be the interface to the external OSS/BSS systems. SMS provides capacity to manage user accounts, devices, services, business rules, billings, and keys.

MMS's notification messages may comply with the AppExtensibility Web Service API Reference. The IPTV notification system then looks up for customer's STB device ID(s) and sends the notification message to the desired STBs. If the customer has not turned off the notification, then the STB pushes a pop-up on the TV. The STB logs all incoming notifications.

Figure 7:
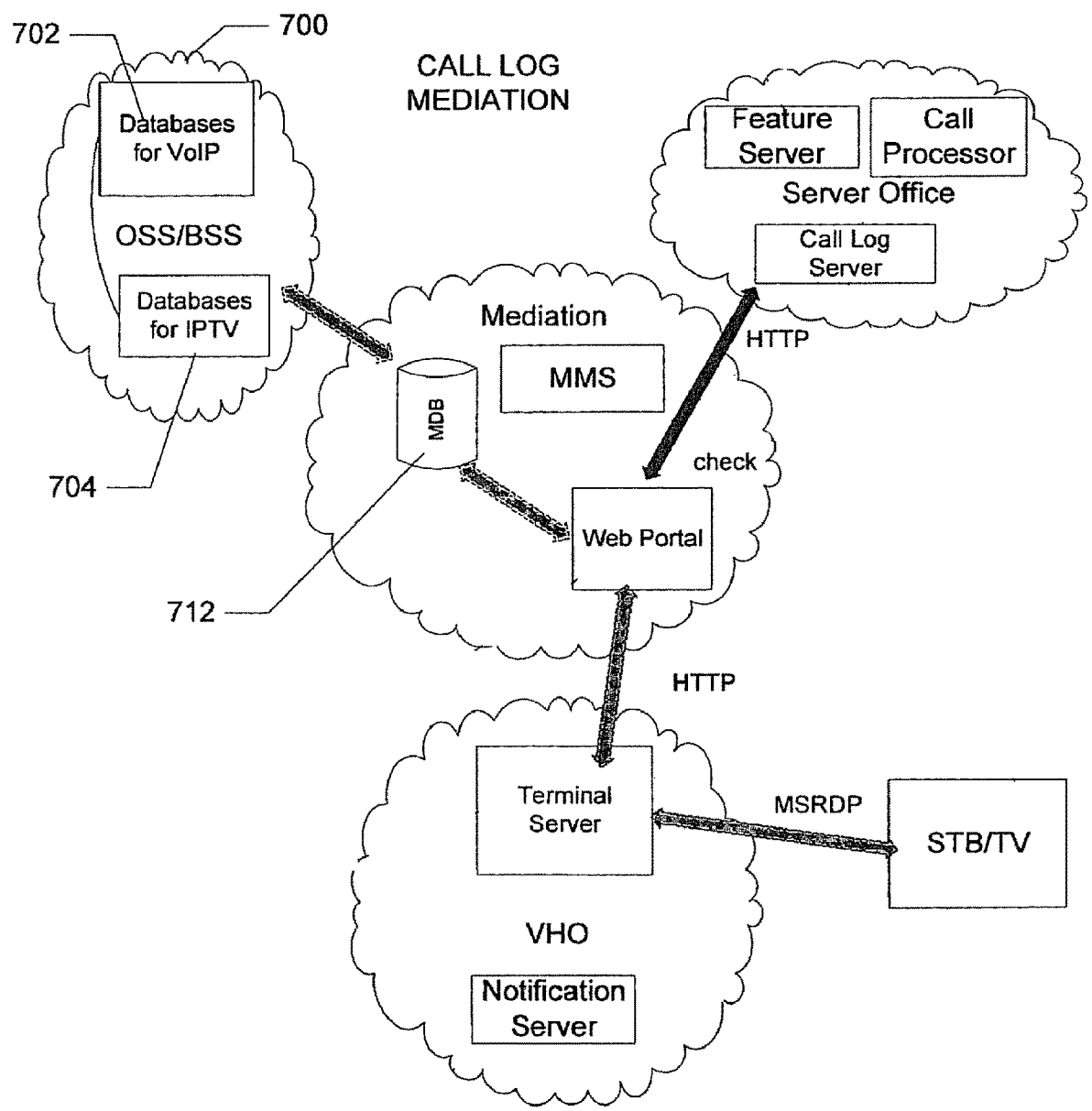
FIG. 7 is a diagrammatic illustration of a specific exemplary embodiment of a call log mediation system of the present disclosure.

FIG. 7 is a diagrammatic illustration of a specific exemplary embodiment of a call log mediation system of the present disclosure. MDB 712 data schema reflects an implicit many-to-one-to-many relationship. A household/service location can have one to many TNs (Telephone Numbers—either VoIP or TDM). The household/service location can also have one to many STB/TVs. MDB 712 data schema may provide a linkage (i.e., mapping) between one or more VoIP databases 702 and IPTV databases 704 which may usually reside in OSS/BSS systems 700.

Continuous synchronization may be provided for the customer data from both VoIP and IPTV platform. Synchronization may be mainly applied to service provisioning data and thus does not consume heavy network traffic.

OSS/BSS systems 700 may physically reside in one or more LDAP servers that may also be used for customer and billing information. Alternatively, another high performance database may be used to ensure short process latency. Due to ongoing service provisioning and data update to synchronize between the VoIP and IPTV customer and infrastructure information, performance requirements take workloads into account. The LDAP may remain the master data source of record, however, even if another database is used for performance reasons.

Figure 8:
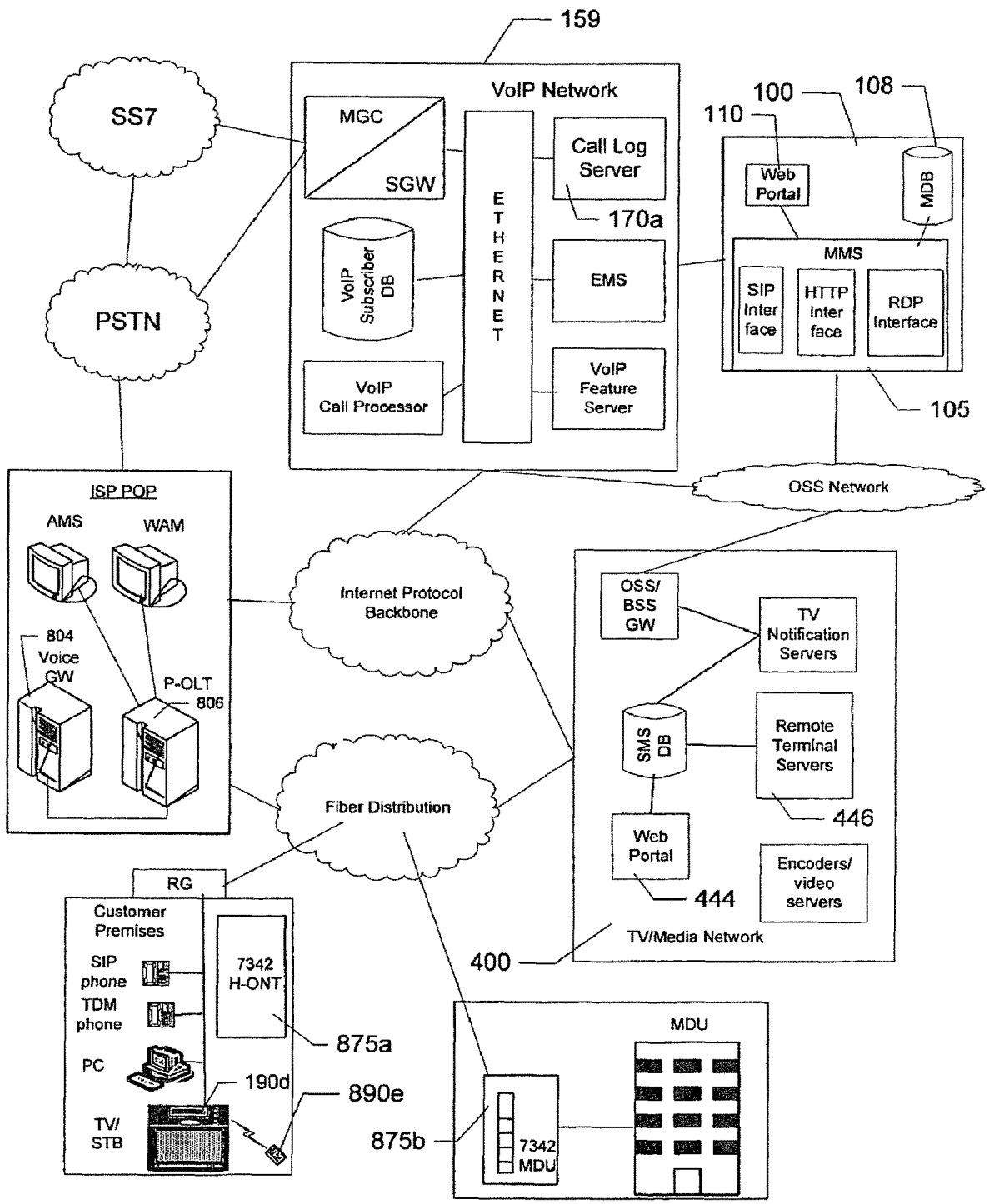
FIG. 8 is a diagrammatic illustration of a specific exemplary embodiment of FTTP architecture for caller ID notification of the present disclosure.

FIG. 8 is a diagrammatic illustration of a specific exemplary embodiment of FTTP architecture for caller ID notification of the present disclosure. Network mediation technology may be described for caller ID information management for FTTP subscribers. According to fiber optic fiber-to-the-premises (FTTP) architecture design, a Voice Gateway (VGW) may be used to support CLASS 5, for example, voice services on FTTP access loop. In particular, as illustrated by FIG. 8, described below.

1) VGW 804 (GB G6 model, for example) may be placed in front of 7342 P-OLT 806 to interface with, for example, local Class 5 switch using a GR303/TR-08 interface.

2) Legacy voice conversion to VoIP from VGW 804 and terminates at 7342 H-ONT 875*a* or 7342 MDU 875*b*, which converts VoIP back to analog voice.

Voice gateway 804 offers an opportunity for a network mediation-based approach as defined above. Accordingly, at least two embodiments may be described to support caller ID information management for TDM calls over FTTP networks:

1) The MDB 108 and MMS 105 infrastructure as defined above may be re-used. Voice Gateway 804 provides a SIP INVITE message to the appropriate MMS 105 in the network whenever an incoming call is signaled.

2) To support the caller ID notification for calls terminated at an FTTP TDM customer as described herein, all the requirements for the present MDB 108 may apply. The interface between MMS 105 and MDB 108 and between MMS 105 and VGW 804 call processor may be internal to the VGW 804 platform. The requirements for MMS 105 to IPTV Branch Office 400 also may apply.

Customer data in MDB 108 may include the following information:

1) Customer identification (e.g., IPTV subscriber external ID); and

2) TDM-based telephony services information for customers, including Phone number(s).

The following information may be managed transparently within the IPTV Branch office to the network mediation functions.

3) Customer identification (e.g., IPTV subscriber external/internal ID);

4) STB ID;

5) Access control policy; and

6) PIN (if access control is turned on).

The TV user may have a built-in account id as a subscriber on the IPTV platform. The user does not enter this identity. Instead, user identity may be determined based on the network path to the user's household. The account id may be provided automatically to all TV UI applications. Each application decides how (and if) to use the built-in account id. When telephone (VoIP) service and video service are activated, the linkage may be established.

Web Portal 444 for IPTV call log support may support standard HTTP interface for caller ID for easy extension to support call log presentation to IPTV platform 190*d*.

The call log support by Web Portal 444 may be architected using the following components:

1) Call log entries extracted from CDR records and stored in a real-time database;

2) A library provides an interface to access the call log entries in the real-time database;

3) Web Portal 444 may run on top of a web server application (e.g., Apache or Tomcat), which uses EJB, for example, to access call log database;

4) Web Portal 444 proxy servers may be deployed to provide front end accesses for customers.

To extend Web Portal 444 to support call log delivery to IPTV platform 190*d*, the following may be recommended:

1) The interface between IPTV Branch office 400 and the Web Portal may be standard HTTP.

2) A Web Portal proxy may be set-up to front end the HTTP communication to/from IPTV branch office 400.

3) Adjust call log presentation to IPTV 190*d* to satisfy product marketing requirements for IPTV specific features based on human factors. For instance:

a. Call log presentation to IPTV 190*d* may have a single list, without navigation among "missed calls", "incoming calls", and "outgoing calls."

b. Call log presentation to IPTV 190*d* may include incoming calls only as default.

4) Call log presentation to IPTV 190*d* adjusted to TV screen characteristics, in considering colors, text, fonts, and the like.

After browsing the call log, a user may delete selected entries in the call log. Since a user's call log may be browsed by different members of the household using different user interfaces (a PC or a TV for example), care should be taken to ensure the synchronization of the call log data between the VoIP server office 159 and web portal 444, especially if web portal 444 (and/or proxy) chooses to "cache" call logs in a local repository.

4) When a user retrieves call logs (via TV or a PC), the user may retrieve all or a user-selected subset of call log entries associated with the household account. Alternative embodiments support call log browsing by each individual phone number of the household.

Customer information, provisioning info, policy and access PIN are frequently updated. This may be an on-going process that may continue during the life span of the service independent of the user actions.

Steps 1 through 8 below describe the process to use an STB remote control 890*e* to browse the call log:

1) An IPTV customer initiates a call log browsing on TV.

2) STB sends an RDP request to Remote Terminal Server (RTS) 446 in serving IPTV branch office 400.

3) If the access control for this user is enabled, RTS 446 collaborates within IPTV branch office 400 to acquire and validate user's access PIN. The user provides his/her PIN to authenticate himself/herself. IPTV branch office 400 either grants the browsing permission or rejects the browsing. If the browsing is granted, the following subsequent steps proceed.

4) Remote Terminal server 446 sends an HTTP request to the Web portal 444.

5) Web portal 444 looks up the URL or IP address for the call log server 170*a*. There may be multiple server offices.

6) Call log server 170*a* requests and retrieves the relevant call log entries from the MDB 108 in MMS 105.

7) Call log server 170*a* presents the call log content to Remote Terminal Server 446 using a suitable presentation format for the IPTV/STB 190*d*.

8) Remote Terminal Server 446 presents the call log entries to the TV screen of IPTV/STB 190*d*.

There may be three groups of call history logs that may be presented: outgoing calls, incoming calls, and missed calls. Web Portal 444 may provide web interfaces to allow a customer to view each individual group respectively.

An alternative embodiment for the present disclosure is described below. In a specific embodiment, a system of the present disclosure takes advantage of an IP Multimedia Subsystem (IMS). IMS is an open, standardized, operator friendly, Next Generation Networking (NGN) multi-media architecture for mobile and fixed IP services. NGN is a VoIP implementation based on a 3GPP variant of SIP, and runs over the standard Internet protocol (IP). NGN may be used by telecom operators in NGN networks (which combine voice and data in a single packet switched network), to offer network controlled multimedia services.

IMS offers to not only provide new services but to provide all the services, current and future, that the Internet provides. In addition, users may execute all their services when roaming as well as from their home networks. To achieve these goals, the IMS uses open standard IP protocols, defined by the IETF. So, a multi-media session between 2 IMS users, between an IMS user and a user on the Internet, and between 2 users on the Internet is established using exactly the same protocol. Moreover, the interfaces for service developers are also based in IP protocols. Accordingly, IMS merges the Internet with the cellular world; IMS uses cellular technologies to provide ubiquitous access and Internet technologies to provide appealing services.

IMS was originally defined by the 3rd Generation Partnership Project (3GPP), as part of the standardization work for third generation (3G) mobile phone systems for W-CDMA networks. The service model, however, has also been used by 3GPP2 and TISPAN (fixed networks). IMS is a technology for Fixed/Mobile Convergence (FMC).

IMS first appeared in release 5 of the evolution from 2G to 3G networks for W-CDMA networks (UMTS), when SIP-based multimedia domain was added to NGN networks. Support for older GSM and GPRS networks is also provided. In 3GPP release 6, interworking with WLAN was added. 3GPP2 based their CDMA2000 Multimedia Domain (MMD) on 3GPP IMS, adding support for CDMA2000. 3GPP release 7 adds support for fixed networks, together with TISPAN R1. "Early IMS" is defined for IPv4 networks, and provides a migration path to IPv6.

IMS potentially works with any network (fixed, mobile or wireless) with packet-switching functions, such as GPRS, UMTS, CDMA2000, WLAN, WiMAX, DSL, cable, and so forth. Older phone systems are supported through gateways. Open interfaces between control and service layers allow elements and calls/sessions from different access networks to be mixed. IMS allows operators and service providers to use different underlying network architectures. The mobile network provides terminal mobility (roaming), while user mobility is provided by IMS and SIP. IMS should make offering IP-based services easier. Examples include voice over IP (VOIP), push-to-talk over cellular (POC), multiparty gaming, videoconferencing, and content sharing.

The IP Multimedia Core Network Subsystem is a collection of different functions, linked by standardized interfaces. A function is not a node (hardware box). An implementer is free to combine two functions in one node, or to split a single function into two or more nodes. Each node can also be present multiple times in a network for load balancing or organizational issues.

The user may connect to an IMS network using various methods using the standard Internet Protocol (IP). Direct IMS terminals (mobile phones, PDAs, computers, and the like) may register directly into an IMS network, even when the user is roaming in another network or country (the visited network). The direct IMS terminal may use IPv6 (also IPv4 in 'Early IMS') running SIP User Agents. Fixed access (e.g., DSL, cable modems, Ethernet, and so forth), mobile access (W-CDMA, CDMA2000, GSM, GPRS, and so forth) and wireless access (WLAN, WiMAX, and the like) are all supported. Other phone systems like the POTS (the old analogue telephones) and H.323, or non-IMS-compatible VoIP systems are supported through gateways.

The HSS (Home Subscriber Server) is a user database that stores user profiles, and performs authentication and authorization of the user.

A SLF (Subscriber Location Function) may be needed when multiple HSSs are used. Both the HSS and the SLF implement the DIAMETER protocol (Cx, Dx and Sh interfaces).

Several types of SIP servers, collectively known as CSCF (Call/Session Control Function), are used to process SIP signaling packets in the IMS. A P-CSCF (Proxy-CSCF) is a SIP proxy that is the first point of contact for the IMS terminal. The may be located either in the visited network (in full IMS networks) or in the home network (when the visited network is not yet IMS compliant). The terminal discovers a corresponding P-CSCF with either DHCP, or the corresponding P-CSCF is assigned in the PDP Context (in GPRS).

A P-CSCF may be assigned to an IMS terminal during registration, and does not change for the duration of the registration. The P-CSCF sits on the path of all signaling messages, and can inspect every message. The P-CSCF authenticates the user and establishes an IPsec security association with the IMS terminal. This prevents spoofing attacks and replay attacks, and protects the privacy of the user. Other nodes trust the P-CSCF and do not have to authenticate the user again. The P-CSCF can also compress and decompress SIP messages, which reduces the round-trip over slow radio links A P-CSCF may include a PDF (Policy Decision Function), which authorizes media plane resources and manages quality of service (QoS) over the media plane, and may be used for policy decisions, lawful interception, bandwidth management, and so forth. The PDF may also be a separate function, for example in a Session Border Controller (SBC). A P-CSCF may also generate charging towards a charging collection node.

An I-CSCF (Interrogating-CSCF) is a SIP proxy located at the edge of an administrative domain. An IP address of the I-CSCF is published in the DNS records of the domain (using NAPTR and SRV), so that remote servers (e.g., a P-CSCF in a visited domain, or a S-CSCF in a foreign domain) can find the I-CSCF, and use the I-CSCF as an entry point for all SIP packets to the domain. The I-CSCF queries the HSS using the DIAMETER Cx and Dx interfaces to retrieve the user location, and then route the SIP request to an assigned S-CSCF. The I-CSCF may also be used to hide the internal network from the outside world (encrypting part of the SIP message), in which case the I-CSCF is called a THIG (Topology Hiding Interface Gateway).

An S-CSCF (Serving-CSCF) is the central node of the signaling plane. The I-CSCF is a SIP server, but performs session control as well. The I-CSCF may be located in the home network. The S-CSCF uses DIAMETER Cx and Dx interfaces to the HSS to download and upload user profiles but typically has no local storage of the user. An S-CSCF handles SIP registrations, allowing the S-CSCF to bind the user location (e.g. the IP address of the terminal) and the SIP address. The S-CSCF sits on the path of all signaling messages, and can inspect every message. The S-CSCF has logic to decide to which application server(s) the SIP message will be forwarded to, in order to provide the services. An S-CSCF also provides routing services, typically using ENUM lookups, for example. Additionally, the S-CSCF enforces the policy of the network operator.

Application servers (AS) host and execute services, and interface with the S-CSCF using SIP. Depending on the actual service, the AS may be operated in SIP proxy mode, SIP US (user agent) mode or SIP B2BUA (back-to-back user agent) mode. An AS may be located in the home network or in an external third-party network. If located in the home network, the AS may query the HSS with the DIAMETER Sh interface (for SIP-AS and OSA-SCS) or the MAP interface (for IM-SSF). Useful acronyms include:

SIP AS: native IMS application server;

OSA-SCS: an Open Service Access—Service Capability Server interfaces with OSA Application Servers using Parlay; and IM-SSF: an IP Multimedia Service Switching Function interfaces with CAMEL Application Servers using CAP.

An MRF (Media Resource Function) provides a source of media in the home network. The MRF may be used, for example, to play or display announcements, mix media streams, transcode between different codecs, and so forth. Each MRF may further be divided into an MRFC (Media Resource Function Controller), which is a signaling plane node that acts as a SIP User Agent to the S-CSCF, and which controls the MFRP with a H.248 interface; and an MRFP (Media Resource Function Processor), which is a media plane node that implements all media-related functions.

A BGCF (Breakout Gateway Control Function) is a SIP server that includes routing functionality based on telephone numbers. The BGCF may be used when calling from the IMS to a phone in a circuit switched network, such as the PSTN or the PLMN.

A PSTN/CS gateway interfaces with PSTN circuit switched (CS) networks. For signaling, CS networks use ISUP (or BICC) over MTP, while IMS uses SIP, For media, CS networks use PCM, while IMS uses RTP.

An SGW (Signaling Gateway) interfaces with the signaling plane of the CS. The SGW transforms lower layer protocols as SCTP (which is an IP protocol) into MTP (which is a SS7 protocol), to pass ISUP from the MGCF to the CS network.

A MGCF (Media Gateway Controller Function) performs call control protocol conversion between SIP and ISUP, and interfaces with the SGW over SCTP. The MGCF also controls the resources in an MGW with a H.248 interface.

An MGW (Media Gateway) interfaces with the media plane of the CS network, by converting between RTP and PCM. The MGW may also transcode when codecs do not match (e.g., IMS might use AMR, PSTN might use G.711).

An ISC (IP multimedia Subsystem Service Control) interface may be between the Serving CSCF and the service platform(s).

An Application Server (AS) offering value added IM services may reside either in the user's home network or in a third party location. The third party may be a network or simply a stand-alone AS.

The Serving-CSCF to AS interface is used to provide services residing in an AS. Two illustrative cases include:

Serving-CSCF to an AS in Home Network.

Serving-CSCF to an AS in External Network (e.g., Third Party or Visited)

The SIP Application Server may host and execute services. The SIP Application Server can influence and impact the SIP session on behalf of the services and the SIP Application Server uses the ISC interface to communicate with the S-CSCF.

The ISC interface may support subscription to event notifications between the Application Server and S-CSCF to allow the Application Server to be notified of the implicit registered public user identities, registration state and UE capabilities and characteristics in terms of SIP User Agent capabilities and characteristics.

The S-CSCF may decide whether an Application Server is required to receive information related to an incoming initial SIP request to ensure appropriate service handling. The decision at the S-CSCF may be based on (filter) information received from the HSS. The filter information may be stored and conveyed on a per application server basis for each user. The name(s)/address(es) information of the application server(s) are received from the HSS.

For an incoming SIP request, the S-CSCF may perform any filtering for ISC interaction before performing other routing procedures towards the terminating user, e.g. forking, caller preferences, and so forth.

Once the IM SSF, OSA SCS or SIP Application Server has been informed of a SIP session request by the S-CSCF, the IM SSF, OSA SCS or SIP Application Server may ensure that the S-CSCF is made aware of any resulting activity by sending messages to the S-CSCF.

From the perspective of the S-CSCF, The "SIP Application server", "OSA service capability server" and "IM-SSF" may exhibit the same interface behavior.

When the name/address of more than one "application server" is transferred from the HSS, the S-CSCF may contact the "application servers" in the order supplied by the HSS. The response from the first "application server" may be used as the input to the second "application server". Multiple "application servers" may be any combination of the SIP Application server, OSA service capability server, or IM-SSF types.

The S-CSCF typically does not provide authentication and security functionality for secure direct third party access to the IM subsystem. The OSA framework provides a standardized way for third party secure access to the IM subsystem.

If an S-CSCF receives a SIP request on the ISC interface that was originated by an Application Server destined to a user served by that S-CSCF, then the S-CSCF may treat the request as a terminating request to that user and provide the terminating request functionality. Both registered and unregistered terminating requests may be supported.

An Application Server may generate SIP requests and dialogs on behalf of users. Such requests may be forwarded to the S-CSCF serving the user, and the S-CSCF shall perform regular originating procedures for these requests.

More specifically the following recommendations may apply to the IMS Service control interface:

1. The ISC interface may convey charging information as understood by those skilled in the art; and 2. The protocol on the ISC interface may allow the S-CSCF to differentiate between SIP requests on Mw (reference point between a CSCF and another CSCF), Mm (reference point between a CSCF and an IP multimedia network) and Mg (reference point between an MGCF and a CSCF) interfaces and SIP Requests on the ISC interface.

Besides the Cx (reference point between a CSCF and an HSS) interface the S-CSCF may support one standardized protocol for service control, which may delegate service execution to an "Application Server". The protocol to be used on the ISC interface may be SIP, other relevant RFC's, and additional enhancements which may be introduced to support 3GPP's needs on the Mw, Mm, Mg interfaces. On the ISC interface, extensions to SIP may be avoided but are not expressly prohibited.

The notion of a "SIP leg" as understood by those skilled in the art may be identical to the notion of a call leg which may be the same as a SIP dialog. The same SIP leg that is received by the S-CSCF on the Mw, Mm and Mg interfaces may be sent on the ISC interface. The same SIP leg that is received by the S-CSCF on the ISC interface may be sent on the Mw, Mm and Mg interfaces.

Concerning the relationship between the SIP legs of the ISC interface and the SIP legs of the Mw, Mm, and Mg interfaces the S-CSCF acts as a SIP proxy.

Offline charging may be applied to users who pay for their services periodically (e.g., at the end of the month). Online charging, also known as credit-based charging, may be used for prepaid services. Both may be applied to the same session.

Some advantages of IMS over existing systems include:
the core network is independent of a particular access technology;
integrated mobility for all network applications;
easier migration of applications from fixed to mobile users;
faster deployment of new services based on standardized architecture;
reduces the number of unique or customized applications, leading to lower CAPEX and OPEX;
new applications such as Presence and Videoconferencing;
evolution to combinational services, for example by combining Instant messaging and voice; and
user profiles are stored in a central location.

Despite the existing ability to run free VoIP applications over the regular Internet, particularly for 3G users, IMS nevertheless offers distinct advantages over VoIP, including Quality of Service; charging for multimedia services and simplified integration of different services.

Figure 9:
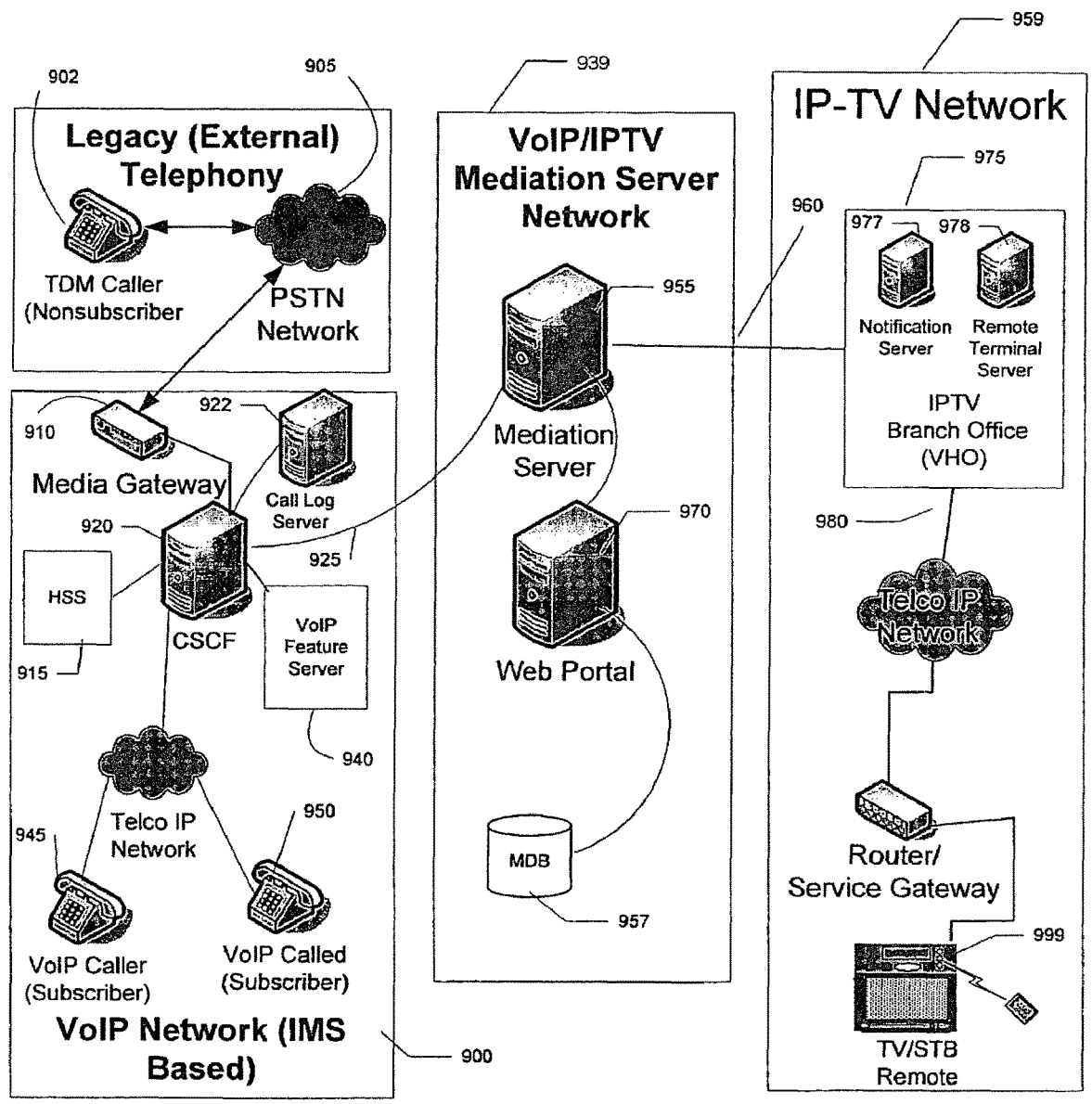
FIG. 9 is a diagrammatic illustration of an alternative specific embodiment of an Internet Protocol Multimedia Subsystem (IMS)-based system for caller ID information mediation of the present disclosure.

In accordance with the present disclosure, caller ID information mediation through IMS is illustrated in FIG. 9. FIG. 9 is a diagrammatic illustration of an alternative specific embodiment of an IMS-based system for caller ID mediation of the present disclosure. The architecture for the TV media network and the VoIP/IPTV mediation platforms may be the same as depicted in FIG. 2, with the exception that the VoIP network platform is based on IMS architecture in which the combination of CSCFs 920 (serving as a VoIP call processor), VoIP Feature Server 940, HSS 915 (i.e., the VoIP subscriber database), Media Gateway Controller and Signaling Gateway 910, and call log server 922 together may form an IMS-based VoIP network (IMS Core) 900.

The MDB 957 interfaces with HSS 915 using a standard database interface, such as DIAMETER or LDAP, and the like. The mediation server 955 interfaces with CSCF 920 using an ISC interface 925, which may be a 3GPP enhanced SIP interface. Web portal 970 in the mediation platform 939 interfaces with Call Log Server 922 using HTTP or HTTPS.

A system of FIG. 9 may be distinguished from a call forking system described above in that the mediation server 955 is not a member of the called party's "Ring All" group. Instead the mediation server 955 is a SIP application server by definition of the IMS standard.

The CSCF 920 forwards a SIP invite to the mediation server 955 when processing the call, not because the called party may have a call forking feature, but because the called party has an "initial Filter Criteria" set-up in his or her profile and the corresponding "Service Point Trigger" instructs CSCF 920 to send a SIP INVITE to the mediation server 955.

A call process flow of FIG. 9 for caller ID notification may proceed as follows:

A call is placed by a calling party 902, 945, from PSTN 905 if the caller is a PSTN customer, or from VoIP network if the caller is a VoIP customer 945. The responsible CSCF 920 serving the calling party 902, 945 processes the "origination leg" of the call. CSCF 920 may work with HSS 915, Feature Server 940 and so forth to process the VoIP features configured for the calling party.

The call process is advanced to the "terminating leg." That is, CSCF 920 serving the terminating party (e.g., a VOIP called party 950) receives the SIP INVITE and works with HSS 915 and Feature Server 940 to process whatever VoIP features may be enabled for the called party (See FIG. 3).

CSCF 920 checks the called party's service profile and decides that the called at party has IPTV via IPTV branch office 975. CSCF 920 forwards a SIP INVITE to mediation server 955 via the ISC interface 925.

Mediation server 955 looks up in MDB 957 to resolve the called party's telephone number to the customer IPTV service information. Mediation server 955 formats a notification message for TV media network 959. Mediation server 955 sends the notification message to the Notification Server 977 in TV media network 959 via link 960. The notification server 977 sends the notification to IPTV STB 999 via link 980. The notification pops up on a screen at the IPTV set top box 999.

A call log process flow of FIG. 9 may proceed as follows:

An IPTV customer uses a remote control menu to initiate the call log view on the IPTV STB 999. STB 999 sends a request to a Remote Terminal Server 978 as the result of the user remote command. The Remote Terminal Server 978 may optionally challenge the user for a PIN if the parental control, for example, is turned on. Remote Terminal Server 978 formats an HTTP (or HTTPS) request and sends the HTTP request to Web portal 970 in mediation platform 939.

Web Portal 970 in mediation platform 939 looks in the MDB 957 to resolve all telephone numbers associated with the IPTV user. Web Portal 970 then formats and sends HTTP (or HTTPS) request to call log server 922 in the IMS-based VoIP network 900. Call log server 922 in the IMS-based VoIP network 900 retrieves all call record entries (or a user-selected subset) in a call log server database and sends the call record entries to the Web Portal 970 in the mediation platform 939.

Web Portal 970 re-formats the call records for presentation on a television coupled to the IPTV STB 999 and sends the resulting call records back to Remote Terminal Server 978 in TV media Network 959. Remote Terminal Server 978 in TV media network 959 sends the call records back to the IPTV STB 999 page by page. The Call records show up on IPTV STB 999 as requested.

Figure 10:
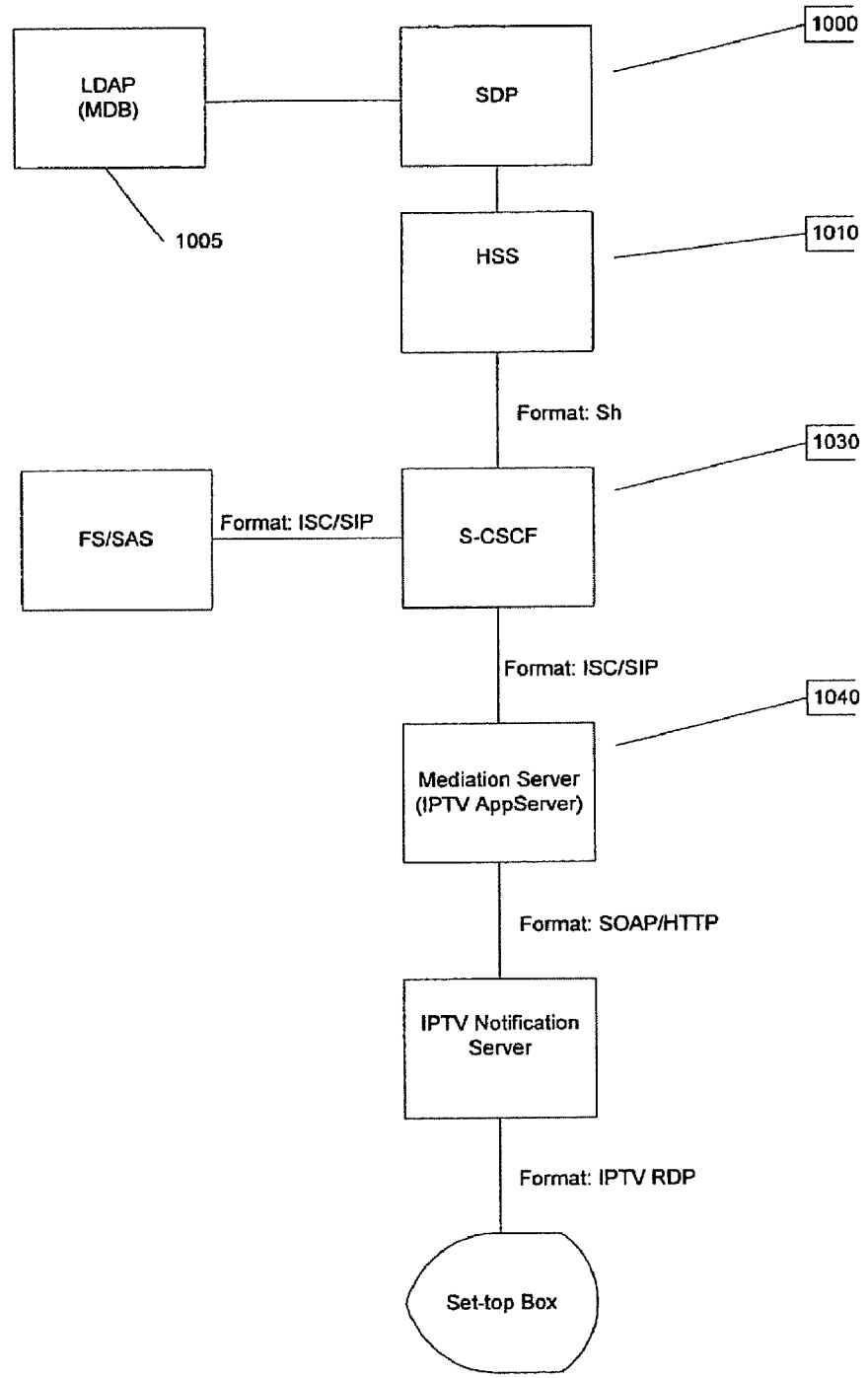
FIG. 10 is a high level diagrammatic illustration of an alternative embodiment of an IMS-based network of FIG. 9 of the present disclosure.

FIG. 10 is a high level diagrammatic representation of an alternative embodiment of a network of FIG. 9. In an embodiment of FIG. 10, a Service Delivery Platform (SDP) 1000 may be a part of an OSS/BSS network. SDP 1000 may be used to coordinate and control provisioning information in the MDB and the IMS HSS database 1010. The MDB may be physically implemented inside the OSS LDAP database 1005. When activating a customer service, SDP 1000 may provision the customer service profile into HSS 1010 and may provision the customer VoIP to IPTV information mapping into the MDB in the LDAP database 1005. Other components may be as described above in FIG. 9 and the notification and call log process flows may also proceed as described for FIG. 9.

Figure 11:
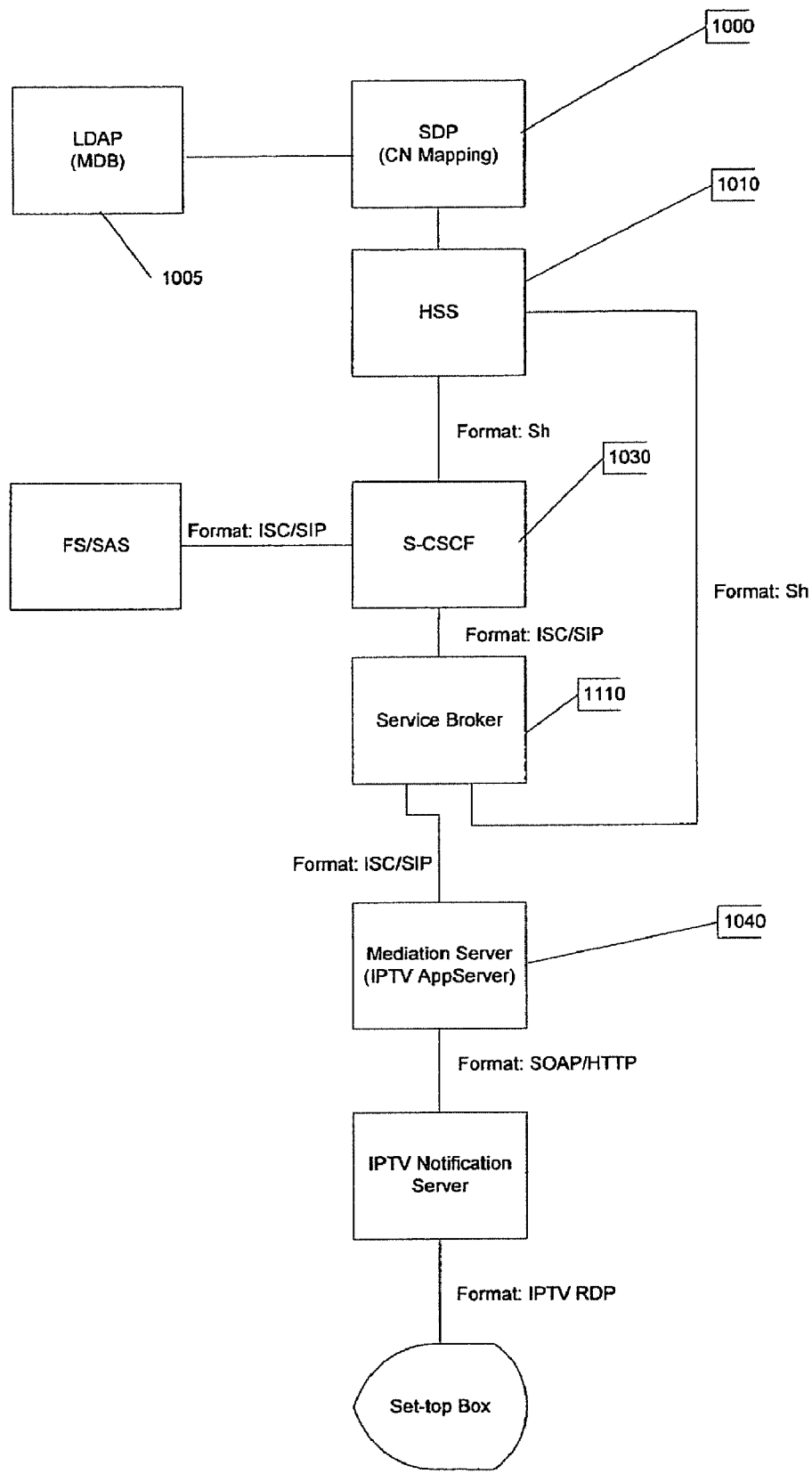
FIG. 11 is a high level diagrammatic illustration of an alternative specific embodiment of a network of FIG. 10 of the present disclosure.

FIG. 11 is a high level diagrammatic representation of an alternative embodiment of a network of FIG. 10. In an embodiment of FIG. 11, an IMS compliant component referred to generically as a Service Broker 1110 may be deployed between a CSCF 1030 and a Mediation MMS server 1040. Service Broker 1110 may interface with CSCF 1030 using an ISC (SIP) interface. Service Broker 1110 may also interface with one or more SIP application servers, including, for example, the Mediation MMS 1040 using an ISC (SIP) interface. Service Broker 1110 may have a direct DIAMETER interface with HSS 1010 as well. Service Broker 1110 may be included in various embodiments of the present disclosure to facilitate VoIP platform coordination of an IPTV caller ID application by MMS 1040 with additional VoIP applications, which may offer additional features as such features come online Service Broker 1110 may coordinate resource usage among all applications, including the MMS. Service Broker 1110 may facilitate handling the complexity of multiple service interactions that may otherwise sometimes generate undesired outcomes.

A call process flow for caller ID notification of FIG. 11 may proceed as described above for FIG. 9, with the distinguishing process steps that the SIP INVITE may be sent from the CSCF 1030 to Service Broker 1110, and Service Broker 1110 may forward the SIP INVITE to MMS 1040.

A call log process flow of FIG. 11 may proceed as described above for FIG. 9, since the HTTP (or HTTPS) messages between the mediation web portal and the call log server need not traverse via Service Broker 1110, CSCF 1030, and so forth.

Embodiments of the present disclosure that deploy a Service Broker component 1110 in an IMS environment may offer the ability to advantageously expand customer services and features such as Presence and videoconferencing. Such embodiments may also facilitate an evolution toward combinatorial services, such as, for example, the combination of instant messaging with voice. A further advantage may be that user profiles may be stored in a central location in a network.

Despite the existing ability to run free VoIP applications over the regular Internet, particularly for 3G users, IMS nevertheless offers distinct advantages over VoIP, including, for example, Quality of Service; charging for multimedia services; simplified integration of multiple services; and enhanced caller ID information such as images, nicknames, email and so forth.

Figure 12:
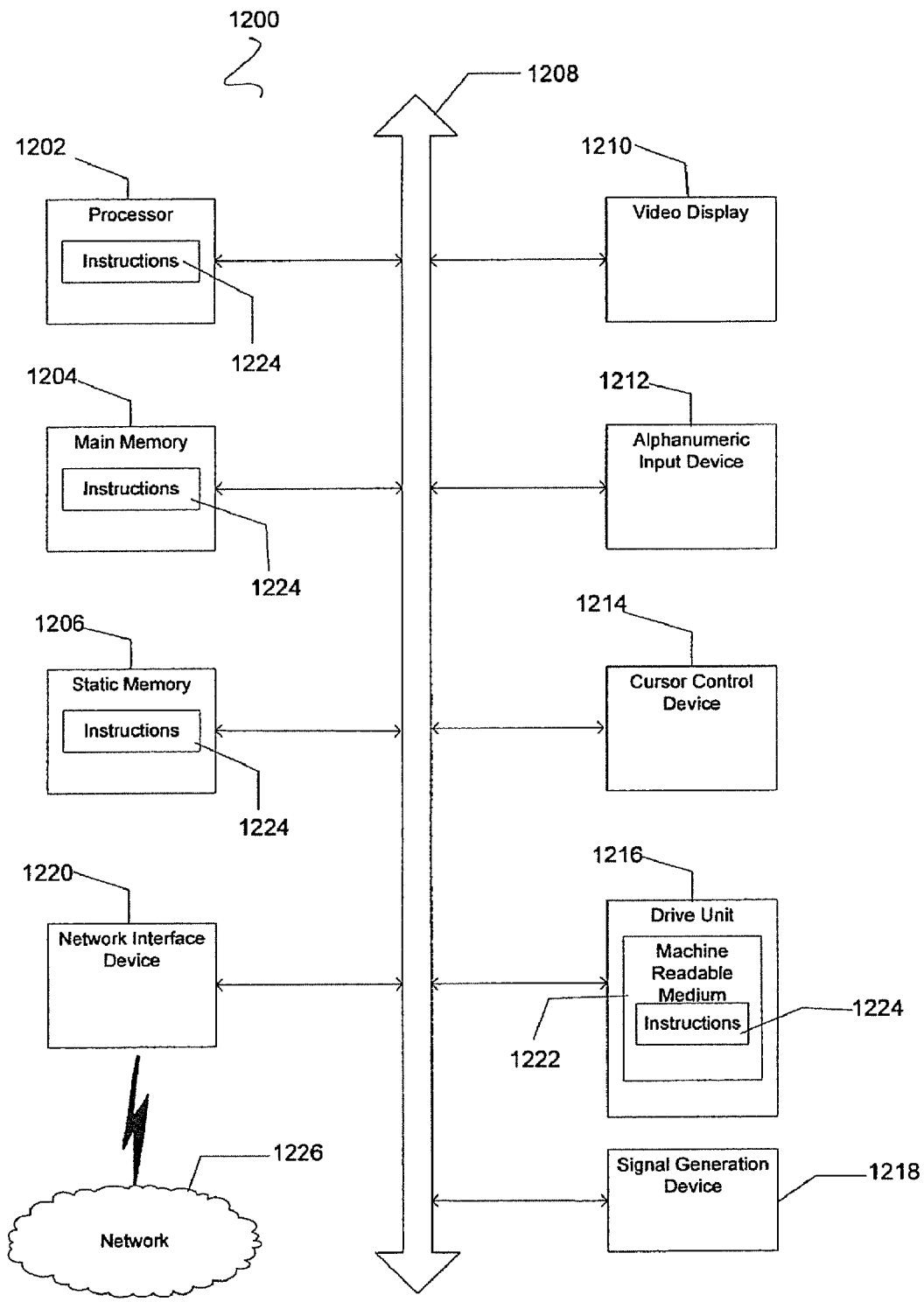
FIG. 12 is a diagrammatic representation of a machine in the form of a computer system within which a set of instructions, when executed, may cause the machine to perform any one or more of the methodologies of the present disclosure.

FIG. 12 is a diagrammatic representation of a machine in the form of a computer system 1200 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. A device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1200 may include a processor 1202 (e.g., a central processing unit (CPU), a graphics processing unit (GPU), or both), a main memory 1204 and a static memory 1206, which communicate with each other via a bus 1208. The computer system 1200 may further include a video display unit 1210 (e.g., a liquid crystal display (LCD), a flat panel, a solid state display, or a cathode ray tube (CRT)). The computer system 1200 may include an input device 1212 (e.g., a keyboard), a cursor control device 1214 (e.g., a mouse or set-top box remote control), a disk drive unit 1216, a signal generation device 1218 (e.g., a speaker or remote control) and a network interface device 1220.

The disk drive unit 1216 may include a machine-readable medium 1222 on which is stored one or more sets of instructions 1224 (e.g., software) embodying any one or more of the methodologies or functions described herein, including those methods illustrated in herein above. The instructions 1224 may also reside, completely or at least partially, within the main memory 1204, the static memory 1206, and/or within the processor 1202 during execution thereof by the computer system 1200. The main memory 1204 and the processor 1202 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1224 so that a device connected to a network environment 1226 can send or receive voice, video or data, and to communicate over the network 1226 using the instructions 1224.

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more machine-readable media, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and the embodiments are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "disclosure" merely for convenience and without intending to voluntarily limit the scope of this application to any single disclosure or inventive concept if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. The Abstract is submitted with the understanding that the Abstract will not be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing as a separate embodiment.

In accordance with various embodiments of the present disclosure, the methods described herein are intended for operation as software programs running on a programmable machine such as a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The software implementations of the present disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories.

Accordingly, those skilled in the art will recognize that the present disclosure extends to machine-readable media ("MRM") contain instructions for execution by a computer. MRM is broadly defined to include any kind of computer memory such as floppy disks, conventional hard disks, CD-ROMs, Flash ROMS, nonvolatile ROM, RAM, Storage Media, solid state media, and magnetic media, together with processors to execute the instructions.

The disclosure has been described with reference to several exemplary embodiments. The words that have been used are words of description and illustration, rather than words of limitation. Changes may be made within the purview of the appended claims, as presently stated and as amended, without departing from the scope and spirit of the disclosure. Although the disclosure has been described with reference to particular means, materials and embodiments, the disclosure is not intended to be limited to the particulars disclosed; rather, the disclosure extends to all functionally equivalent technologies, structures, methods and uses such as are within the scope of the appended claims.

What is claimed is:
1. A method comprising:
sending, from a voice over internet protocol server to a message mediation server, a first session initiation protocol invite message including call information for an incoming call and an identifier of a destination telephony device, wherein the first session initiation protocol invite message is configured to cause the message mediation server to:
determine, by the message mediation server, an application programming interface notification format associated with a first media device of a set of media devices associated with the destination telephony device based on a customer database;
generate, by the message mediation server, a notification message based on the application programming interface notification format and the first session initiation protocol invite message;
initiate storage to the customer database, by the message mediation server, of a call record based on the call information;
send, from the message mediation server, the call information to the first media device via the notification message; and
sending, from the voice over internet protocol server, a second session initiation protocol invite message that includes the call information to the destination telephony device, the second session initiation protocol invite message sent at least partially in parallel with the first session initiation protocol invite message, wherein the second session initiation protocol invite message is sent via a message path independent of the message mediation server;

receiving a request, by the voice over internet protocol server from a television network server via the message mediation server, for call log entries associated with multiple calls delivered to the destination telephony device;

sending call log information, by the voice over internet protocol server via the message mediation server, to the television network server to enable display of the call log entries at a display device coupled to the first media device that received the call log information from the television network server;

receiving, by the voice over internet protocol server from a second media device via the message mediation server, user input to delete a call log entry of the call log entries, wherein the first media device and the second media device are distinct media devices of the set of media devices;

deleting, by the voice over internet protocol server, the call log entry from the call log information to generate second call log information;

receiving, by the voice over internet protocol server, a second request from the television network server via the message mediation server for the call log entries; and sending, by the voice over internet protocol server, the second call log information to the television network server via the message mediation server to enable display of the call log entries at a second display device coupled to a third media device of the set of media devices that received the second call log information from the television network server.

2. The method of claim 1, wherein the set of media devices are accessible via the television network server.

3. The method of claim 1, further comprising receiving the call information prior to sending the first session initiation protocol invite message.

4. The method of claim 1, wherein the call information includes caller identification information associated with a calling party.

5. The method of claim 1, further comprising accessing a service profile associated with the destination telephony device.

6. The method of claim 5, wherein the first session initiation protocol invite message is sent responsive to the service profile indicating that a destination number is associated with an internet-protocol television destination.

7. The method of claim 5, further comprising identifying a plurality of features enabled for the service profile.

8. The method of claim 1, wherein a particular media receiver of the set of media devices includes a set-top box device.

9. A system comprising:
a memory that stores instructions; and
a processor coupled to the memory, wherein responsive to executing the instructions, the processor performs operations comprising:
sending, to a message mediation server, a first session initiation protocol invite message including call information for an incoming call and an identifier of a destination telephony device, wherein the first session initiation protocol invite message is configured to cause the message mediation server to:
determine, by the message mediation server, an application programming interface notification format associated with a first media device of a set of media devices associated with the destination telephony device based on a customer database;
generate, by the message mediation server, a notification message based on the application programming interface notification format and the first session initiation protocol invite message;
initiate storage to the customer database, by the message mediation server, of a call record based on the call information; and
send, from the message mediation server, the call information to the first media device via the notification message; and
sending a second session initiation protocol invite message that includes the call information to the destination telephony device, the second session initiation protocol invite message sent at least partially in parallel with the first session initiation protocol invite message, wherein the second session initiation protocol invite message is sent via a message path independent of the message mediation server;

receiving a request from a television network server via the message mediation server for call log entries associated with multiple calls delivered to the destination telephony device;

sending call log information to the television network server via the message mediation server to enable display of the call log entries at a display device coupled to the first media device that received the call log information from the television network server;

receiving, from a second media device via the message mediation server, user input to delete a call log entry of the call log entries, wherein the first media device and the second media device are distinct media devices of the set of media devices;

deleting the call log entry from the call log information to generate second call log information;

receiving a second request from the television network server via the message mediation server for the call log entries; and sending the second call log information to the television network server via the message mediation server to enable display of the call log entries at a second display device coupled to a third media device of the set of media devices that received the second call log information from the television network server.

10. The system of claim 9, wherein the set of media devices are accessible via a television network server.

11. The system of claim 9, wherein the operations further comprise receiving the call information prior to sending the first session initiation protocol invite message.

12. The system of claim 9, wherein the call information includes caller identification information associated with a calling party.

13. The system of claim 9, wherein the operations further comprise accessing a service profile associated with the destination telephony device.

14. The system of claim 13, wherein the first session initiation protocol invite message is sent responsive to the service profile indicating that a destination number is associated with an internet-protocol television destination.

15. The system of claim 13, wherein the operations further comprise identifying a plurality of features enabled for the service profile.

16. The system of claim 15, wherein a particular media receiver of the set of media devices includes a set-top box device.

17. A computer-readable storage device storing instructions that, when executed by a processor, cause the processor to perform operations comprising:
- sending, to a message mediation server, a first session initiation protocol invite message including call information for an incoming call and an identifier of a destination telephony device, wherein the first session initiation protocol invite message is configured to cause the message mediation server to:
  - determine, by the message mediation server, an application programming interface notification format associated with a first media device of a set of media devices associated with the destination telephony device based on a customer database;
  - generate, by the message mediation server, a notification message based on the application programming interface notification format and the first session initiation protocol invite message;
  - initiate storage to the customer database by the message mediation server, of a call record based on the call information;
  - send, from the message mediation server, the call information to the first media device via the notification message; and
- sending a second session initiation protocol invite message that includes the call information to the destination telephony device, the second session initiation protocol invite message sent at least partially in parallel with the first session initiation protocol invite message, wherein the second session initiation protocol invite message is sent via a message path independent of the message mediation server;
- receiving a request from a television network server via the message mediation server for call log entries associated with multiple calls delivered to the destination telephony device;
- sending call log information to the television network server via the message mediation server to enable display of the call log entries at a display device coupled to the first media device that received the call log information from the television network server;
- receiving, from a second media device via the message mediation server, user input to delete a call log entry of the call log entries, wherein the first media device and the second media device are distinct media devices of the set of media devices;
- deleting the call log entry from the call log information to generate second call log information;
- receiving a second request from the television network server via the message mediation server for the call log entries; and
- sending the second call log information to the television network server via the message mediation server to enable display of the call log entries at a second display device coupled to a third media device of the set of media devices that received the second call log information from the television network server.

18. The computer-readable storage device of claim 17, wherein the set of media devices are accessible via a television network server.

19. The computer-readable storage device of claim 17, wherein the operations further comprise receiving the call information prior to sending the first session initiation protocol invite message.

20. The computer-readable storage device of claim 17, wherein the call information includes caller identification information associated with a calling party.

* * * * *